US010127820B2

(12) United States Patent
Park

(10) Patent No.: US 10,127,820 B2
(45) Date of Patent: Nov. 13, 2018

(54) DRIVER ASSISTANCE APPARATUS AND VEHICLE INCLUDING THE SAME

(71) Applicant: LG ELECTRONICS INC., Seoul (KR)

(72) Inventor: Sangha Park, Seoul (KR)

(73) Assignee: LG Electronics Inc., Seoul (KR)

( * ) Notice: Subject to any disclaimer, the term of this patent is extended or adjusted under 35 U.S.C. 154(b) by 167 days.

(21) Appl. No.: 14/973,821

(22) Filed: Dec. 18, 2015

(65) Prior Publication Data
US 2017/0039856 A1 Feb. 9, 2017

(30) Foreign Application Priority Data

Aug. 5, 2015 (KR) .................. 10-2015-0110780

(51) Int. Cl.
G08G 1/16 (2006.01)
B60W 30/12 (2006.01)
G01C 21/34 (2006.01)
B60R 1/00 (2006.01)
B60W 50/14 (2012.01)

(52) U.S. Cl.
CPC ............ G08G 1/167 (2013.01); B60R 1/00 (2013.01); B60W 30/12 (2013.01); G01C 21/34 (2013.01); G08G 1/166 (2013.01); B60K 2350/2047 (2013.01); B60K 2350/2052 (2013.01); B60R 2300/205 (2013.01); B60R 2300/301 (2013.01); B60R 2300/302 (2013.01); B60R 2300/308 (2013.01); B60W 2050/146 (2013.01); B60W 2420/42 (2013.01); B60W 2550/10 (2013.01); B60W 2550/308 (2013.01); B60W 2550/402 (2013.01); B60W 2550/408 (2013.01); B60W 2750/40 (2013.01)

(58) Field of Classification Search
CPC ....... G01C 21/365; G08G 1/167; H04W 4/04; H04W 4/046; B60W 30/12; B60W 2050/146
USPC .......................................... 701/23
See application file for complete search history.

(56) References Cited

U.S. PATENT DOCUMENTS 8,520,695 B1 * 8/2013 Rubin .................. G08G 9/02
370/445
8,797,417 B2 * 8/2014 Gayko .................. G06T 5/005
348/154
2003/0146827 A1 8/2003 Koike
(Continued)

FOREIGN PATENT DOCUMENTS

JP 2000-207563 7/2000
JP 2007-122578 5/2007
(Continued)

OTHER PUBLICATIONS

Extended European Search Report in European Application No. 16000009.7, dated Mar. 24, 2017, 9 pages (with English translation).

Primary Examiner — Isaac G Smith
(74) Attorney, Agent, or Firm — Fish & Richardson P.C.

(57) ABSTRACT

A driver assistance apparatus is provided. The driver assistance apparatus includes a processor determining whether lanes are not identified based on at least one of image information, distance information, sensor information, navigation information, secondary information and adjacent vehicle information, and generating virtual lanes; and an output unit outputting the generated virtual lanes.

27 Claims, 23 Drawing Sheets

(56) References Cited

U.S. PATENT DOCUMENTS

| | | | |
|---|---|---|---|
| 2007/0032245 A1* | 2/2007 | Alapuranen | G08G 1/161 455/456.1 |
| 2009/0167560 A1 | 7/2009 | Becker | |
| 2011/0273582 A1 | 11/2011 | Gayko et al. | |
| 2011/0301813 A1* | 12/2011 | Sun | B62D 15/029 701/41 |
| 2012/0296561 A1* | 11/2012 | Park | G01C 21/3635 701/119 |
| 2013/0131925 A1* | 5/2013 | Isaji | B62D 6/00 701/41 |
| 2014/0358321 A1* | 12/2014 | Ibrahim | G01S 19/39 701/1 |
| 2015/0149023 A1* | 5/2015 | Attard | B60W 30/182 701/28 |
| 2015/0213592 A1* | 7/2015 | Mochizuki | B60K 35/00 345/632 |

FOREIGN PATENT DOCUMENTS

| | | |
|---|---|---|
| JP | 2007122578 A * | 5/2007 |
| JP | 2007-257286 | 10/2007 |
| JP | 2011-028625 | 2/2011 |
| JP | 2011-128786 | 6/2011 |
| JP | 5348180 | 11/2013 |
| JP | 2015-005132 | 1/2015 |
| JP | 2015-087891 | 5/2015 |
| KR | 10-2015-0019083 | 2/2015 |
| KR | 10-1502511 | 3/2015 |
| KR | 10-2015-0074750 | 7/2015 |

* cited by examiner

DRIVER ASSISTANCE APPARATUS AND VEHICLE INCLUDING THE SAME

CROSS-REFERENCE TO RELATED APPLICATIONS

The present application claims priority under 35 U.S.C. 119 and 35 U.S.C. 365 to Korean Patent Application No. 10-2015-0110780 filed on Aug. 5, 2015, which is hereby incorporated by reference in its entirety.

BACKGROUND

The present disclosure relates to a driver assistance apparatus in a vehicle, a control method therefor, and a vehicle including the driver assistance apparatus.

A vehicle is an apparatus that moves a user in a direction in which he or she wants to go. Its typical example may be a car.

In addition, for the convenience of a user who uses a vehicle, the inclusion of various sensors and electronic devices is a modern trend. In particular, various devices for the driving convenience of a user are being developed.

In situations, such as under bad weather, at night or on an unpaved road, there may be cases where a driver may not identify lanes. For example, in case that the sewage or water temporarily contaminates the wind shield of the vehicle, the driver may not secure his or her external view and an accident may thus occur.

Also, when the lanes are not identified, negotiation with another vehicle on traffic lanes may not be made and an accident may thus occur. For example, in case that a crossroad has two or more left turn lanes having no actual lanes, vehicles turning to the left on both lanes drive in directions in which drivers have arbitrarily determined, so there is a limitation in that safety is not ensured.

That is, in a situation where views of lanes are not secured or in case that negotiation between vehicles on a driving direction is required because there is no lane, there is a limitation in that the risk of accidents increases because lanes that are common rules among vehicles are not identified.

SUMMARY

Embodiments provide a driver assistance apparatus that provides virtual lanes when lanes are not identified and thus assists a driver in driving, and a vehicle including the same.

In one embodiment, a driver assistance apparatus includes a processor determining whether lanes are not identified based on at least one of image information, distance information, sensor information, navigation information, secondary information and adjacent vehicle information, and generating virtual lanes; and an output unit outputting the generated virtual lanes.

In still further another embodiment, a vehicle includes a display device according to the above-described embodiment.

The details of one or more embodiments are set forth in the accompanying drawings and the description below. Other features will be apparent from the description and drawings, and from the claims.

BRIEF DESCRIPTION OF THE DRAWINGS

FIG. 27 is an example of an internal block diagram of the vehicle of FIG. 1.

DETAILED DESCRIPTION OF THE EMBODIMENTS

Figure 1:
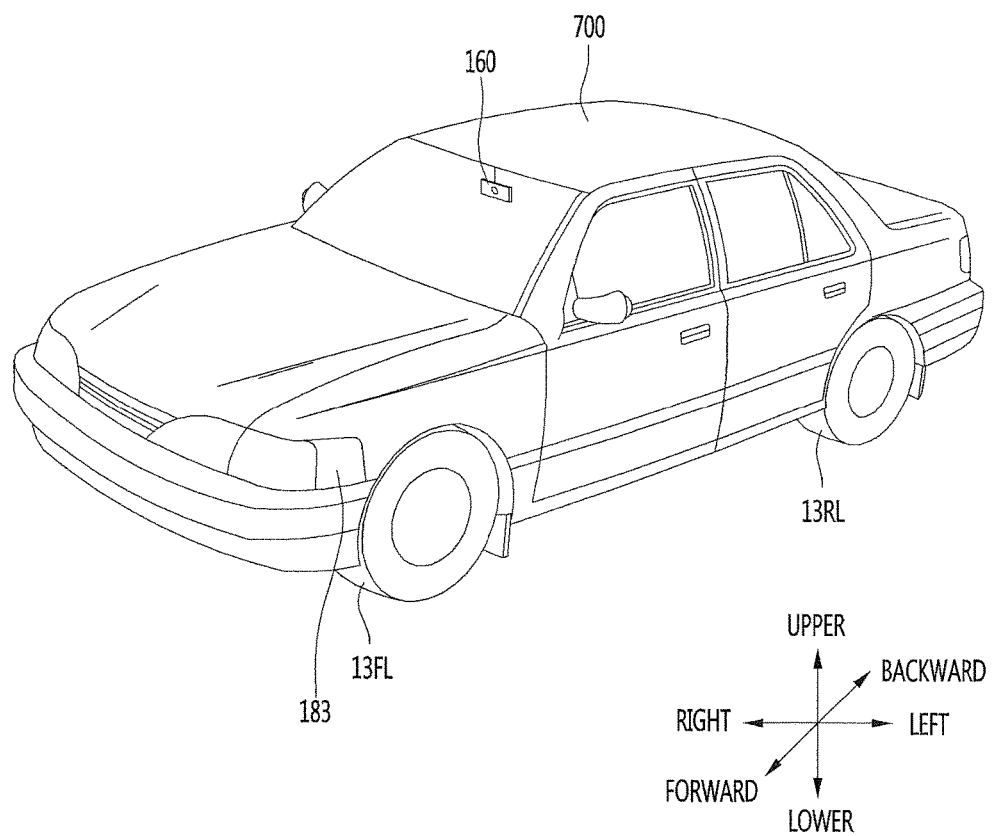
FIG. 1 is a diagram showing the exterior of a vehicle that includes a driver assistance apparatus according to an embodiment.

Hereinafter, embodiments are described in detail with reference to the accompanying drawings and regardless of the numbers of the drawings, same or similar components are assigned with the same reference numerals and thus repetitive descriptions for those are omitted. Since the suffixes "module" and "unit" for components used in the following description are given and interchanged for easiness in making the present disclosure, they do not have distinct meanings or functions. In describing the embodiments disclosed in the present disclosure, detailed descriptions of related known technologies will be omitted because they would obscure the subject of the embodiments disclosed in the present disclosure. Also, the accompanying drawings are used to help easily understanding embodiments disclosed herein but the technical idea disclosed in the present disclosure is not limited thereto. It should be understood that all of variations, equivalents or substitutes contained in the concept and technical scope of the inventive concept are also included.

Although the terms 'first' and 'second' may be used to describe various components, these components should not be limited to these terms. The terms are used only in order to distinguish a component from another component.

When it is mentioned that any component is "connected" or "accessed" to another component, it should be understood that the former can be directly connected to the latter, or there may be another component in between. On the contrary, when any component is referred to as being 'directly connected' or 'directly accessed' to another component, it should be understood that there may be no other component in between.

The terms in singular form include the plural form unless otherwise specified.

It should be understood that the term "includes" or "has" indicates the presence of characteristics, numbers, steps, operations, components, parts or combinations thereof represented in the present disclosure but does not exclude the presence or addition of one or more other characteristics, numbers, steps, operations, components, parts or combinations thereof.

A vehicle discussed in the present disclosure may include a car or motorcycle. In the following, the car of the vehicle is mostly discussed.

The vehicle discussed in the present disclosure may include all of an internal combustion engine vehicle that includes an engine as a power source, a hybrid vehicle that includes an engine and an electrical motor as a power source, and an electrical vehicle that includes an electrical motor as a power source.

In the following description, the right side of the vehicle means the left side of the driving direction of the vehicle and the right side of the vehicle means the right side of the driving direction of the vehicle.

In the following description, a left hand drive (LHD) vehicle is mostly described unless mentioned to the contrary.

In the following, a driver assistance apparatus is described in detail with reference to FIGS. 1 to 15.

Figure 2:
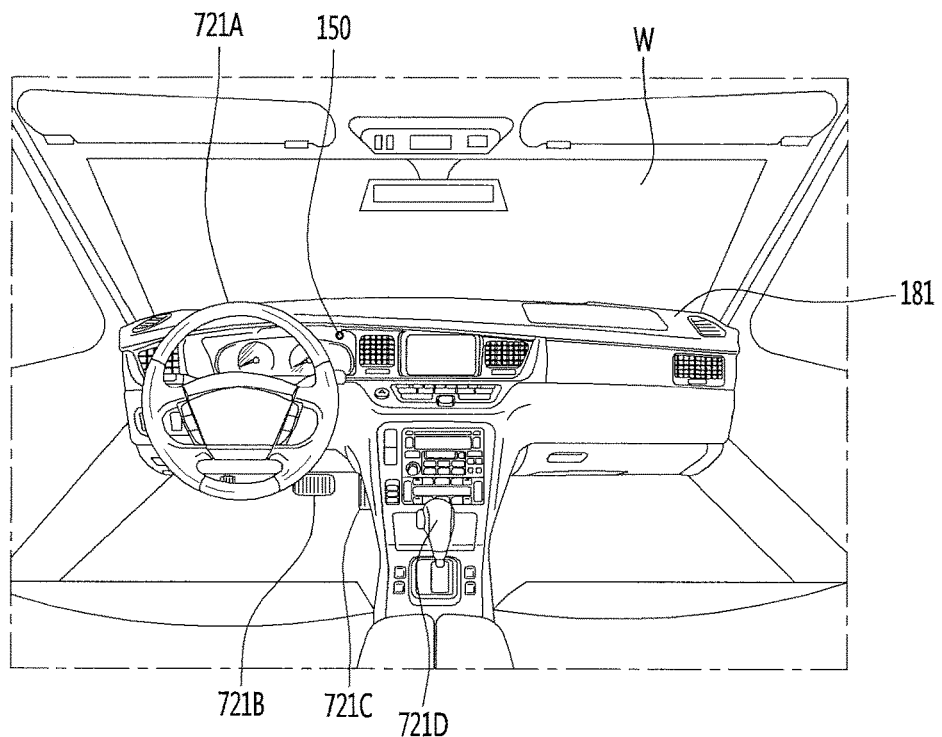
FIG. 2 is a diagram showing the interior of a vehicle that includes a driver assistance apparatus according to an embodiment.
Figure 3:
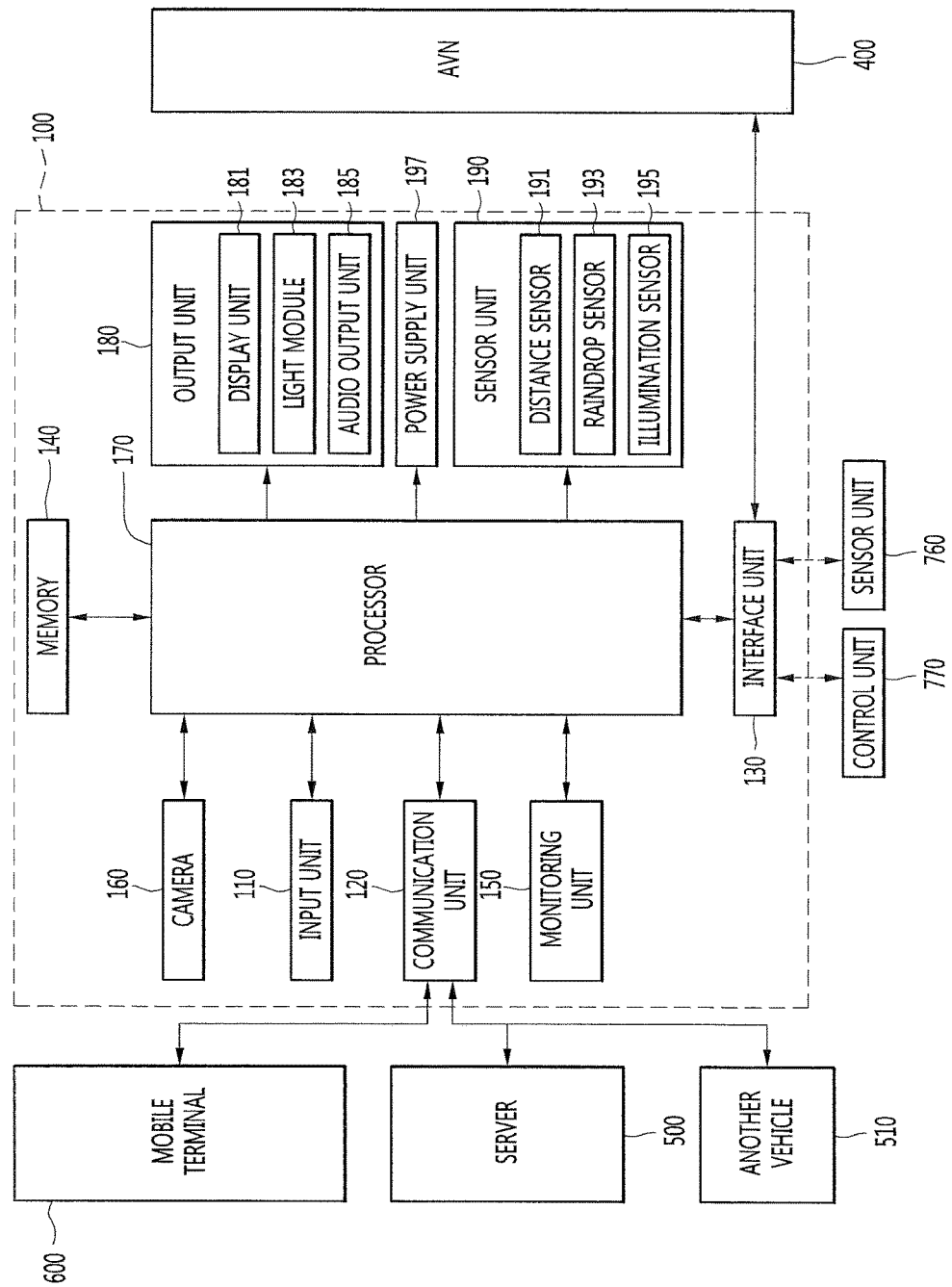
FIG. 3 represents a block diagram of a driver assistance apparatus according to an embodiment.

FIG. 1 is a diagram showing the exterior of a vehicle that includes a driver assistance apparatus according to an embodiment, FIG. 2 is a diagram showing the interior of a vehicle that includes a driver assistance apparatus according to an embodiment, and FIG. 3 represents a block diagram of a driver assistance apparatus according to an embodiment.

Referring to FIGS. 1 to 3, a vehicle 700 may include wheels 13FL and 13FR that rotate by a power source, a wind shield W for securing a view in front of the vehicle 700, a driving control unit 721A, 721B, 723C, and 724D for controlling the driving of the vehicle 700, and a driver assistance apparatus 100.

In this example, the driver assistance apparatus 100 is a separate apparatus and may perform a function of assisting driving by transmitting and receiving required information through data communication with the vehicle 700, or some of units of the vehicle 700 may also be defined as the driver assistance apparatus 100.

In addition, in the case of the separate apparatus, some of units of the driver assistance apparatus 100 of FIG. 3 may not be included in the driver assistance apparatus 100 but may be a unit of the vehicle 700 or another apparatus in the vehicle 700. By transmitting and receiving data through an interface unit 130 of the driver assistance apparatus 100, these units may be understood to be included in the driver assistance apparatus 100.

Although the driver assistance apparatus 100 according to an embodiment are described to include units shown in FIG. 3, it is also possible to use units in the vehicle 700 through the interface unit 130 and the driver assistance apparatus may also be implemented by a combination of units in the vehicle 700.

In the following description, the driver assistance apparatus 100 is described to include units required for the driver assistance apparatus 100 to generate and output virtual lanes.

Referring to FIGS. 1 to 3, such a driver assistance apparatus 100 may include an input unit 110, a communication unit 120, an interface unit 130, a memory 140, a monitoring unit 150, a camera 160, a processor 170, an output unit 180, a sensor unit 190, and a power supply unit 197.

Firstly, the driver assistance apparatus 100 may include the input unit 110 that senses a user's input. The user may set and control, through the input unit 110, secondary functions that the driver assistance apparatus 100 provides.

Specifically, the input unit 110 may correspond to a plurality of buttons that is disposed in the vehicle 700 to sense a user touch input, or a touch sensor that is disposed on the display unit 181.

Through the touch input, the user may control an execution input for the power on/off of the driver assistance apparatus 100, whether to display virtual lanes, the characteristics of the virtual lanes, etc.

Next, the driver assistance apparatus 100 may include a communication unit 120 that performs data communication with another vehicle 510, a terminal 600, a server 500, etc. The driver assistance apparatus 100 may receive navigation information and/or adjacent vehicle information through the communication unit 120. In addition, the received information may be used for determining whether lanes are identified and generating virtual lanes.

Also, the driver assistance apparatus 100 may transmit the generated virtual lane information to an adjacent vehicle through the communication unit to share common virtual lane information with the adjacent vehicle.

Specifically, the communication unit 120 may exchange data with the other vehicle 510, the mobile terminal 600 or the server 500 wirelessly. In particular, the communication unit 120 may wirelessly exchange data with the mobile terminal of a vehicle 700 driver. The wireless data communication scheme may include various data communication schemes, such as Bluetooth, WiFi, Direct WiFi, APiX, and/or NFC schemes.

The communication unit 120 may receive position information, weather information, or road traffic information, e.g., transport protocol expert group (TPEG) information, from the mobile terminal 600 and/or the server 500.

Also, the communication unit 120 may also receive navigation information from the mobile terminal 600, when the mobile terminal 600 is used as a navigation device. In this example, the navigation information may include at least one of map information relating to vehicle 700 driving, position information on the vehicle, preset destination information, and route information depending on a destination.

That is, the communication unit 120 may receive the navigation information through the mobile terminal 600 or a direct access to a transport server.

Also, the communication unit 120 may receive the adjacent vehicle information from the other vehicle 510. Specifically, the communication unit 120 may receive the adjacent vehicle information from the other vehicle 510 that is disposed within a certain preset distance. In this example, the adjacent vehicle information may include at least one of the position of the other vehicle 510, the distance between the other vehicle 510 and the vehicle 700, the speed of the other vehicle 510, the driving direction of the other vehicle 510, and virtual lanes that the other vehicle 510 has set.

In addition, the communication unit 120 may transmit, to the other vehicle 510, virtual lane information generated by the driver assistance apparatus 100. In this case, the driver assistance apparatus 100 may share the virtual lane information with the other vehicle 510 through the communication unit 120 and correct the position of the virtual lane.

Accordingly, when lanes are not identified, the driver assistance apparatus 100 may generate the virtual lanes to assist the user in driving and also transmit the generated virtual lanes to an adjacent vehicle so that the driver of the adjacent vehicle may recognize the generated virtual lanes. Thus, since the vehicle 700 and the adjacent vehicle may share common virtual lanes while driving, it is possible to achieve safe driving.

Also, when a user gets in the vehicle 700, the mobile terminal 600 of the user and the driver assistance apparatus 100 may also perform pairing automatically or by the execution of an application by the user.

Also, the communication unit 120 may receive traffic information, such as a change of a traffic light, from an external server 500. In this example, the server 500 may be a server that is located at a traffic control center controlling traffic.

Next, the driver assistance apparatus 100 may include the interface unit 130 that transmits and receives data between the sensor unit 190 and/or control unit of the vehicle 700 and the driver assistance apparatus 100.

Specifically, the driver assistance apparatus 100 may receive navigation information and/or sensor information through the interface unit 130. In addition, the received information may be used for determining whether lanes are identified and generating virtual lanes.

Also, the vehicle assistance apparatus 100 may deliver, through the interface unit 130, an input for executing an action when lanes are not identified. For example, when the wind shield W is contaminated, the driver assistance apparatus 100 may operate a wafer or an air conditioner through the interface unit 130 and deliver an execution signal for a self-driving function (e.g., adaptive cruise control (ACC)) to the control unit of the vehicle 700.

To this end, the interface unit 130 may perform data communication with the control unit 770, an audio video navigation (AVN) device 400 and/or a vehicle sensor unit 760 in the vehicle 700 through wired or wireless communication.

Specifically, the interface unit 130 may receive navigation information through data communication with the AVN device 400 and/or the navigation device of the vehicle 700.

Also, the interface unit 130 may receive sensor information from the control unit 770 or the vehicle sensor unit 760.

In this example, the sensor information may include at least one of the direction information, position information, speed information, acceleration information, tilt information, forward/backward movement information, fuel information and turn signal information on the vehicle 700.

Also, the sensor information may be acquired from a heading sensor, a yaw sensor, a gyro sensor, a position module, a vehicle's forward/backward movement sensor, a wheel sensor, a vehicle speed sensor, a vehicle-body tilt sensor, a battery sensor, a fuel sensor, a tire sensor, a steering sensor by the rotation of a steering wheel, a vehicle's internal temperature sensor, a vehicle 700's internal humidity sensor, etc. The position, module may include a GPS module for GPS information reception.

In particular, the sensor information may include information on a distance to an object that gets in the way of the vehicle 700. For example, the sensor information may include information on a distance to the other vehicle 510 and may include information on distances to a driving blocking object on a road and to a median strip, a curb, street trees, etc. corresponding to indirect road signs.

The interface unit 130 may receive a user input receive through the user input unit 710 of the vehicle 700. The interface unit 130 may receive the user input from the user input unit 710 of the vehicle 700 or through the control unit 770. That is, in case that the input unit 710 is disposed as a component of the vehicle 700 therein, it is possible to receive the user input through the interface unit 130.

The interface unit 130 may also receive traffic information acquired from the server 500. The server 500 may be a server that is located at a traffic control center controlling traffic. For example, in case that the traffic information is received from the server 500 through the communication unit 120 of the vehicle 700, the interface unit 130 may also receive the traffic information from the control unit 770.

Next, the memory 140 may store various pieces of data for the overall operations of the driver assistance apparatus 100, such as programs for processing or controlling by the processor 170.

Specifically, the memory 140 may store data for object verification. For example, the memory 140 may store data for verifying through a certain algorithm what an object is when a certain object is detected from an image acquired through the camera 160.

For example, the memory 140 may store data for verifying through the certain algorithm what traffic information is when certain traffic information is detected from the image acquired through the camera 160.

Also, the memory 140 may store data for verifying an indirect road sign capable of assisting in predicting lanes, adjacent vehicles, portions of lanes, driving blocking objects, etc., from the image acquired through the camera 160.

Also, the memory 140 may be various storage devices, such as ROMs, RAMs, EPROMs, flash drives, hard drives, etc. that are hardware.

Next, the driver assistance apparatus 100 may include the monitoring unit that captures an internal image of the vehicle 700.

Specifically, the monitoring unit 150 may acquire an image of a passenger. The monitoring unit 150 may acquire an image for the biometrics of the passenger. That is, the monitoring unit 150 may be an image acquisition module that is disposed in the vehicle 700.

The processor 170 may analyze an image of a user acquired through the monitoring unit 150 to detect a line of sight of the user. In addition, the processor 170 may control the display unit 181 so that virtual lanes are displayed on the wind shield W in consideration of the detected line of sight.

Next, the driver assistance apparatus 100 may include the camera 160 that captures images in front of and/or around the vehicle 700. In addition, the driver assistance apparatus 100 may acquire image information through the camera 160. Also, the driver assistance apparatus 100 may use the acquired image information to determine whether lanes are not identified and generate virtual lanes when the lanes are not identified.

The camera 160 may captures images around the vehicle 700. Specifically, the camera 160 may capture images in front of the vehicle 700 to acquire front images and the processor 170 may analyze objects included in the front images to acquire image information.

For example, in case that the images captured by the camera 160 include lanes, adjacent vehicles, driving blocking objects, and other objects, such as a median strip, a curb, street trees, etc. that correspond to an indirect road sign, the processor 170 may detect such objects to include them in image information. In this case, the processor 170 may acquire information on a distance to an object detected through a sensor to further supplement image information.

Such a camera 160 may include an image sensor and an image processing module. The camera 160 may process a still image or video that is obtained by an image sensor (e.g., CMOS or CCD). The image processing module may process the still image or vide acquired by the image sensor to extract necessary information and transmit the extracted information to the processor 170.

In this case, the camera 160 may include a stereo camera 160 to enhance the measurement accuracy of an object and further secure information on a distance between the vehicle 700 and an object, etc.

In the following, the process of analyzing an object included in an image by using the stereo camera 160 is described with reference to FIGS. 4 to 6.

Figure 4:
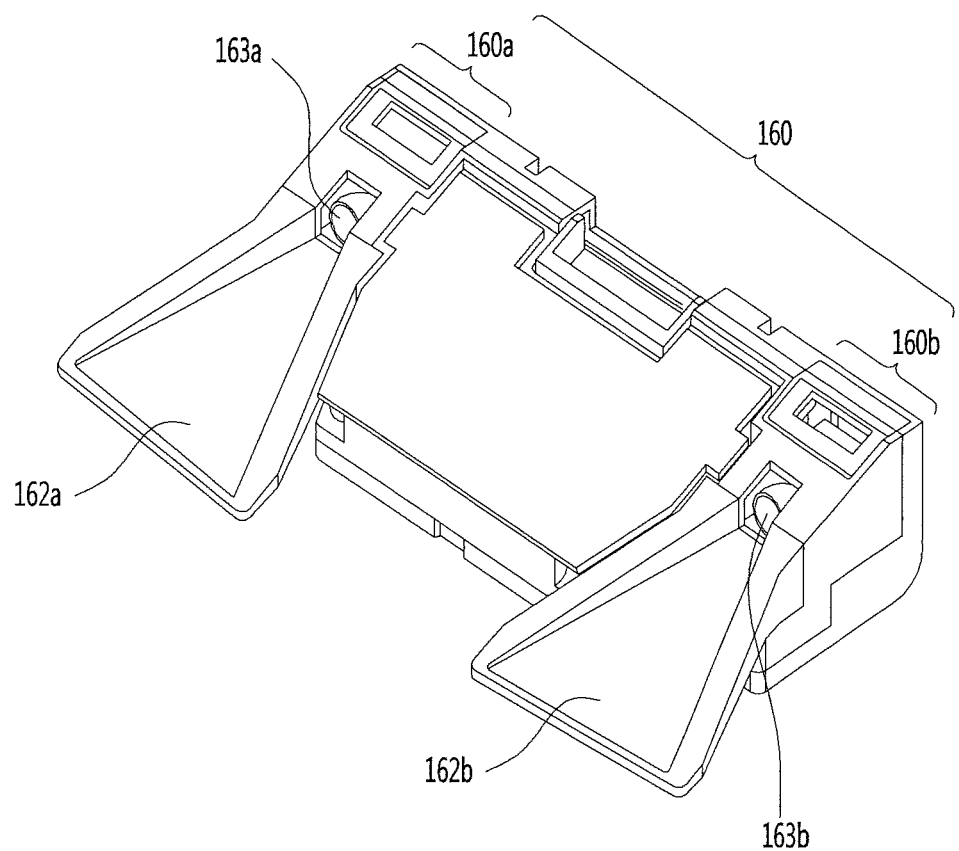
FIG. 4 is a diagram that is referred to describe a camera attached to the vehicle of FIG. 1 according to an embodiment.

FIG. 4 is a diagram that is referred to describe the camera 160 attached to the vehicle 700 of FIG. 1 according to an embodiment.

Firstly, although FIG. 4 shows that the vehicle 700 driver assistance apparatus includes two cameras 160, the embodiment is not limited to the number of the cameras 160.

Figure 5:
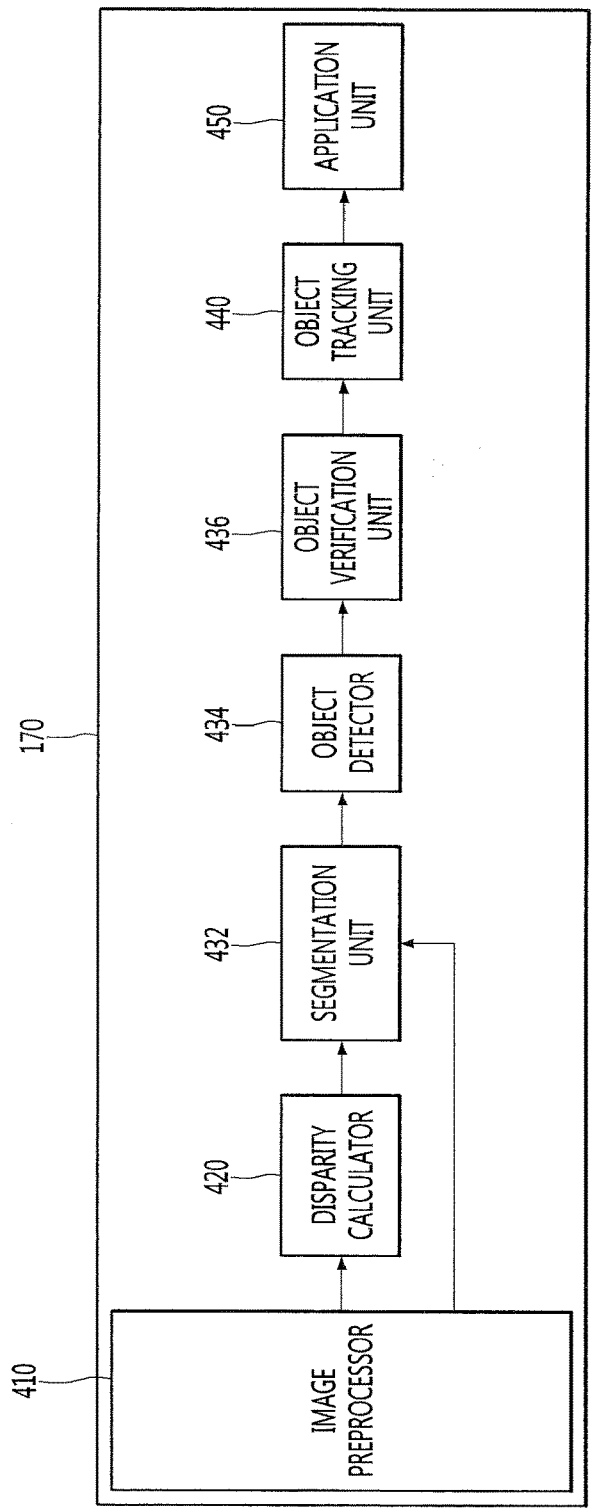
FIG. 5 represents by a block diagram a portion of a processor processing an image according to an embodiment.
Figure 6:
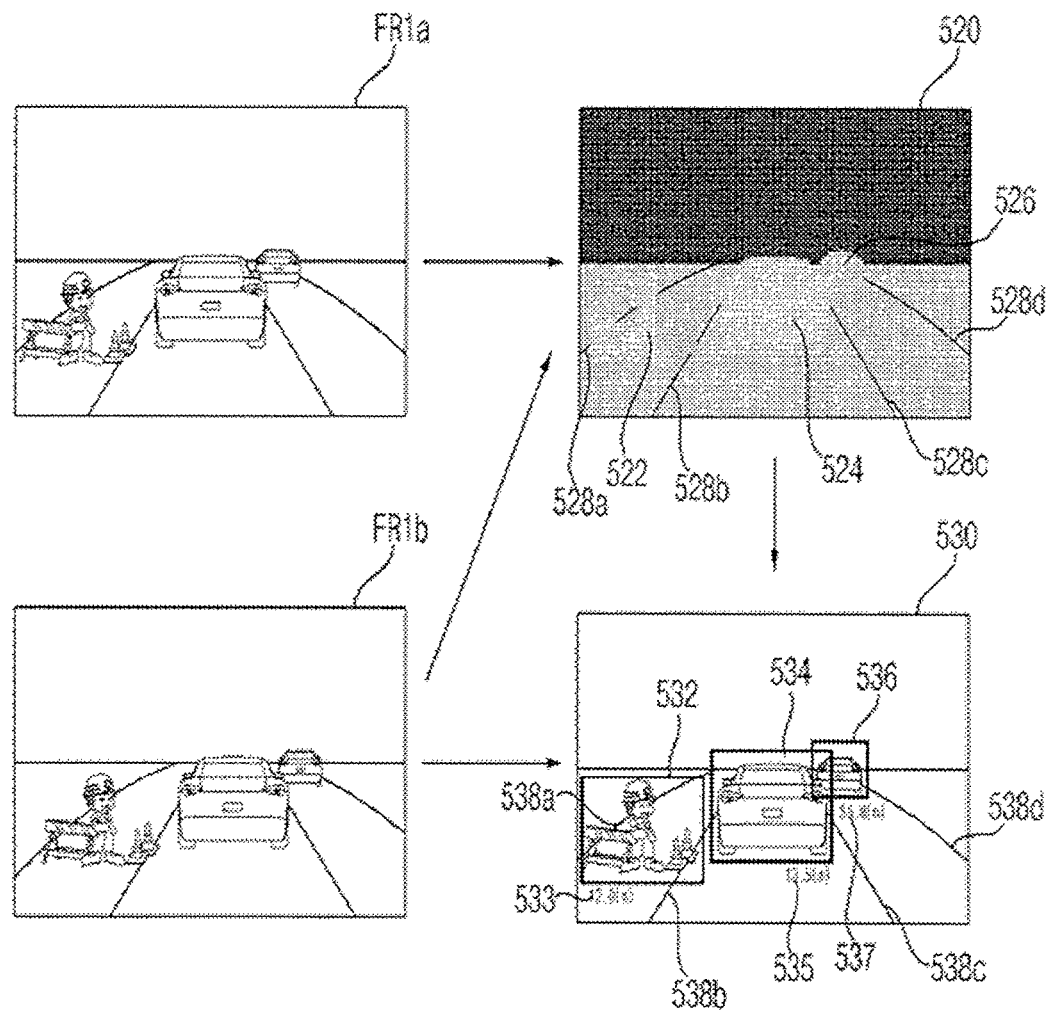
FIG. 6 is a diagram that is referred to describe the operation of the processor of FIG. 5.

Referring to FIGS. 4 to 6, the vehicle 700 driver assistance apparatus may include a first camera 160a including a first lens 163a and a second camera 160b including a second lens 163b. In this case, the camera 160 may be named the stereo camera 160.

The vehicle 700 driver assistance apparatus may include a first light shield 162a and a second light shield 162b for preventing light from entering the first lens 163a and the second lens 163b, respectively.

Such a vehicle 700 driver assistance apparatus may acquire a stereo image in front of the vehicle 700 from the first and second cameras 160a and 160b, perform disparity detection based on the stereo image, perform object detection on at least one stereo image based on the disparity information, and after the object detection, continue to track the motion of an object.

FIG. 5 represents by a block diagram a portion of the processor 170 processing an image according to an embodiment. FIG. 6 is a diagram that is referred to describe the operation of the processor 170 of FIG. 5.

A method of detecting the processor 170 image information is described in more detail with reference to FIGS. 5 and 6.

FIG. 5 is an internal block diagram of the processor 170 according to an embodiment. FIG. 6 is a diagram that is referred to describe the operation of the processor 170 of FIG. 5.

Firstly, FIG. 5 is an example of the internal block diagram of the processor 170 and the processor 170 in the driver assistance apparatus 100 may include an image preprocessor 410, a disparity calculator 420, an object detector 434, an object tracking unit 440, and an application unit 450. Although in FIG. 5 and the following description, it is described that an image is processed in the order of the image preprocessor 410, the disparity calculator 420, the object detector 434, the object tracking unit 440, and the application unit 450, an embodiment is not limited thereto.

The image preprocessor 401 may receive an image from the camera 160 to perform preprocessing.

In particular, the image preprocessor 410 may perform, on the image, noise reduction, rectification, calibration, color enhancement, color space conversion (CSC), interpolation, camera 160 gain control, and so on. Thus, it is possible to acquire an image clearer than a stereo image captured by the camera 160.

The disparity calculator 420 may receive an image signal-processed by the image preprocessor 410, perform stereo matching on the received image, and acquire a disparity map according to stereo matching. That is, it is possible to acquire disparity information on a stereo image in front of the vehicle 700.

In this case, the stereo matching may be performed in units of pixels or predetermined blocks of the stereo images. The disparity map may mean a map that represents binocular parallax information on the stereo images, i.e., left and right images by a numerical value.

The segmentation unit 432 may perform segment and clustering on at least one images based on disparity information from the disparity calculator 420.

In particular, the segmentation unit 432 may separate the background from the foreground for at least one of stereo images based on the disparity information.

For example, it is possible to calculate, a region of the disparity map in which the disparity information is less than or equal to a predetermined value, as the background and remove a corresponding part. Thus, the foreground may be relatively separated. As another example, it is possible to calculate, a region of the disparity map in which the disparity information is equal to or greater than a predetermined value, as the foreground and extract a corresponding part. Thus, the foreground may be separated.

As such, by separating the foreground from the background based on the disparity information extracted based on the stereo image, it is possible to reduce a signal processing speed, a signal processing amount, and so on when an object is detected later.

Next, the object detector 434 may detect an object based on an image segment from the segmentation unit 432.

That is, the object detector 434 may detect an object for at least one of images, based on the disparity information.

In particular, the object detector 434 may detect an object for at least one of images, based on the disparity information. For example, it is possible to detect an object from the foreground separated by the image segment.

Next, the object verification unit 436 may classify and verify the separated object.

To this end, the object verification unit 436 may use an identification method using a neural network, a support vector machine (SVM) method, an identification method by AdaBoost using Haar-like features, a histograms of oriented gradients (HOG) method, or the like.

The object verification unit 436 may compare objects stored in the memory 140 with detected objects to verify an object.

For example, the object verification unit 436 may verify a vehicle 700, lane, road surface, sign, dangerous area, tunnel and the like that are located around the vehicle 700.

The object tracking unit 440 may perform tracking on the verified object. For example, it is possible to verify objects in acquired stereo images, calculate the motion or motion vector of the verified objects, and track the movement of a corresponding object based on the calculated motion or motion vector, sequentially. Thus, it is possible to track the vehicle 700, lane, road surface, sign, dangerous area, tunnel and the like that are located around the vehicle 700.

Next, the application unit 450 may calculate the degree of risk to the vehicle 700 based on various objects, e.g., another vehicle 700, lanes, road surfaces, signs and so on that are located around the vehicle 700. Also, it is possible to calculate collision possibility with the front car, whether the vehicle 700 slips, and so on.

In addition, based on the calculated degree of risk, collision possibility or slipping possibility, the application unit 450 may output, as vehicle 700 operation assistance information, a message for notifying a user of such information. Alternatively, it is also possible to generate, a control signal for posture control or driving control of the vehicle 700, as vehicle 700 control information.

The image pre-processor 410, the disparity calculator 420, the segmentation unit 432, the object detector 434, the object verification unit 436, the object tracking unit 440 and the application unit 450 may be the internal components of the image processor in the processor 170.

According to an embodiment, the processor 170 may include only some of the image pre-processor 410, the disparity calculator 420, the segmentation unit 432, the object detector 434, the object verification unit 436, the object tracking unit 440 and the application unit 450. If the camera 160 includes a mono camera 160 or around view camera 160, the disparity calculator 420 may be excluded. According to an embodiment, the segmentation unit 432 may also be excluded.

Referring to FIG. 6, the camera 160 may acquire a stereo image for a first frame section.

The disparity calculator 420 in the processor 170 may receive stereo images FR1*a* and FR1*b* signal-processed by the image pre-processor 410, and perform stereo matching on the received stereo images FR1*a* and FR1*b* to acquire a disparity map 520.

The disparity map 520 puts parallax between the stereo images FR1*a* and FR1*b* into level, and it is possible to calculate that a distance to the vehicle 700 is less as a disparity level becomes greater, and the distance to the vehicle 700 is greater as the disparity level becomes less.

Such a disparity map may be displayed to have high luminance the higher the disparity level is and to have low luminance the lower the disparity level is.

FIG. 6 illustrates that in the disparity map 520, first to fourth lanes 528*a* to 528*d* respectively have corresponding disparity levels, and a construction area 522, a first front vehicle 700 or 524, and a second front vehicle 700 or 526 respectively have corresponding disparity levels.

The segmentation unit 432, the object detector 434, and the object verification unit 436 performs segment, object detection, and object verification on at least one of the stereo images FR1*a* and FR1*b* based on the disparity map 520.

FIG. 6 illustrates how to detect and verify an object on the second stereo image FR1*b* by using the disparity map 520.

That is, in an image 530, object detection and verification may be performed on first to fourth lanes 538*a* to 538*d*, a construction area 532, a first front vehicle 700 or 534, and a second front vehicle 700 or 536.

In addition, the processor 170 may generate, as image information, information on objects detected and verified on the image as described above, determine through the image information whether lanes are identified, and generate virtual lanes when the lanes are not identified.

Next, the driver assistance apparatus 100 may include the output unit 180 that provides the generated virtual lanes to a driver. In addition, the output unit 180 may include at least one of the display unit 181, a light module 183, and an audio output unit 185.

Firstly, the display unit 181 may display various pieces of information processed by the processor 170.

Specifically, the display unit 181 may display the generated virtual lanes as images so that a driver may visually verify. Also, the display unit 181 may display an image related to the operation of the vehicle 700 driver assistance apparatus. For such an image display, the display unit 181 may include a cluster or head up display (HUD) on the front surface in the vehicle 700. In case that the display 181 is the HUD, it may include a projection module that projects an image onto the front glass of the vehicle 700.

In an embodiment, the display unit 181 is a head up display 181 that projects and displays an image onto the wind shield W of the vehicle 700, and includes a projection module that projects an image onto the wind shield W. In addition, since a projected image projected by the projection module may have certain transparency and a user may thus see the projected image and a view behind the projected image simultaneously, the user may also check an external situation reflecting a virtual lane display region along with the virtual lanes.

The projected image displayed on such a display unit 181 may overlap a reflected image reflected to the window shield W to implement augmented reality (AR). In this case, the projected image may be the virtual lane, and it is possible to enhance driving safety because a driver may verify the virtual lane while keeping eyes forward. In particular, in case that the wind shield W is temporarily contaminated and it is thus difficult to identify the outside, there is an advantage in that a driver may safely drive on the virtual lane displayed on the wind shield W.

Figure 7:
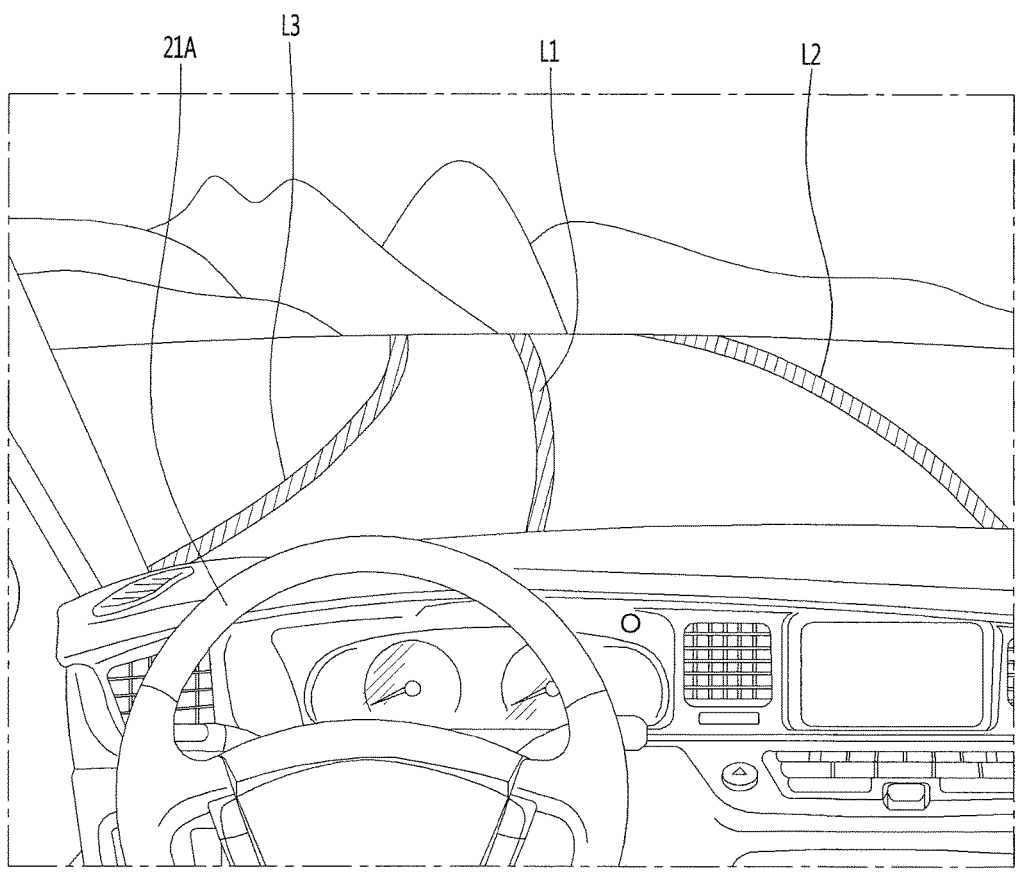
FIG. 7 represents how a display unit according to an embodiment displays virtual lanes.

FIG. 7 represents how the display unit 181 according to an embodiment displays virtual lanes.

FIG. 7 represents how the display unit 181 displays virtual lanes L1 to L3 that are generated on the wind shield W. Specifically, the display unit 181 may display the virtual lanes L1 to L3 so that they match external images reflected through the wind shield W. The displayed virtual lanes L1 to L3 may be lanes assisting the vehicle 700 in driving. For example, the virtual lanes L1 to L3 may include lanes allowing the vehicle 700 to drive, the center lane, lanes representing the outermost width that allows driving, etc.

Furthermore, in case that there are differences between the virtual lanes L1 to L3 of an adjacent vehicle and those of the user vehicle 700, the virtual lanes L1 to L3 may further include the virtual lanes (not shown) of the adjacent vehicle to be capable of assisting the user in understanding lanes which the adjacent vehicle recognizes and on which the adjacent vehicle drives.

Also, it is also possible to display the virtual lanes L1 to L3 through the display unit 181 that is disposed in the vehicle 700. The display unit 181 may include at least one of a liquid crystal display (LCD), a thin film transistor-liquid crystal display (TFT LCD), an organic light-emitting diode (OLED), a flexible display, a 3D display, and an e-ink display.

The output unit 180 may further include the light module 183 that displays the generated virtual lanes on the road surface.

The light module 183 may display virtual lanes that are generated by the irradiating of laser beams to the road surface.

Specifically, the light module 183 may display the generated virtual lanes on the road surface in front of the vehicle 700 so that a driver may see them. Also, the light module 183 may also display the generated virtual lanes on the road surface on the left and right of the vehicle 700 so that a driver of another vehicle 510 may see them. Furthermore, the light module 183 may also display the generated virtual lanes on the road surface behind the vehicle 700 so that a following vehicle 42 may identify them.

Figure 8:
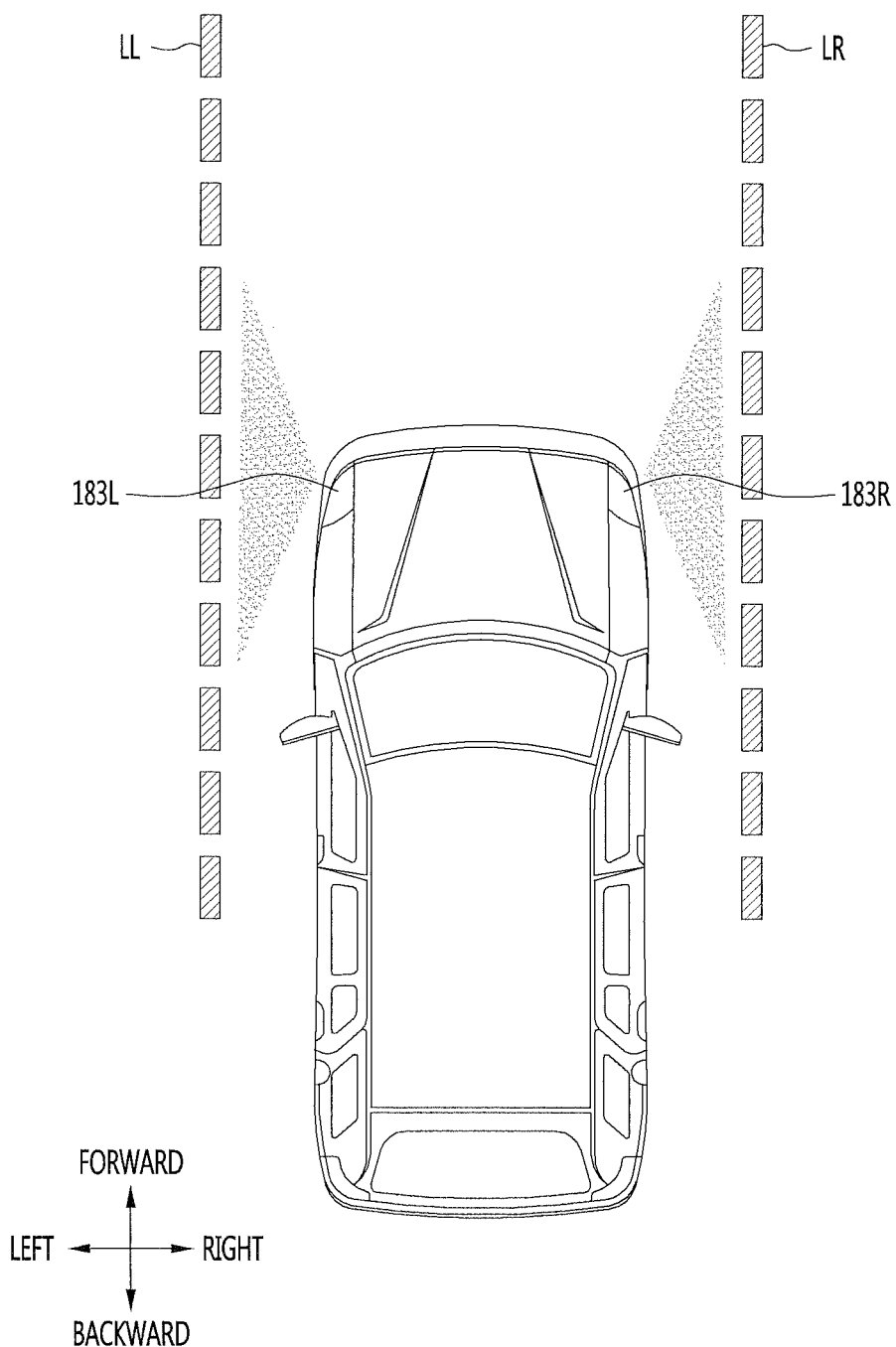
FIG. 8 represents how a light module according to an embodiment displays virtual lanes.

FIG. 8 represents how the light module 183 according to an embodiment displays virtual lanes.

Referring to FIG. 8, light modules 183 are installed on the left and right sides of the vehicle 700 and the light modules

183 may irradiate laser beams to the front, left and right of the vehicle 700 to display virtual lanes LL and LR.

Since such a light module 183 may provide a route that the vehicle 700 drives, to an adjacent vehicle as well as a user so that it is possible to clearly recognize the route, it is possible to prevent the adjacent vehicle from approaching and thus assist safe driving.

The output unit 180 may further include the audio output unit 185. The audio output unit 185 may output information on virtual lane generation to a user through sound. In particular, the audio output unit 185 may output notice related to advanced driver assistance systems (ADAS) based on the generated virtual lanes. That is, when the virtual lanes are generated, the driver assistance apparatus 100 may perform the ADAS based on the virtual lanes.

Figure 9:
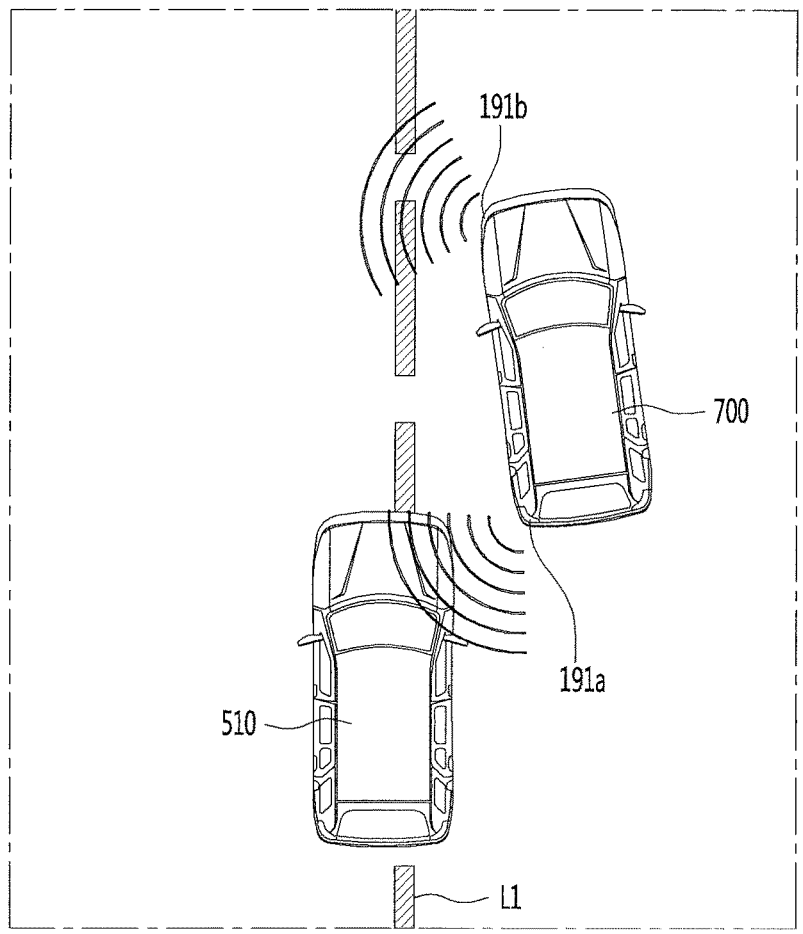
FIG. 9 represents how a driver assistance apparatus according to an embodiment warns an adjacent vehicle.

FIG. 9 represents how the driver assistance apparatus 100 according to an embodiment warns an adjacent vehicle.

Referring to FIG. 9, when another vehicle 510 enters a virtual lane generated by the user vehicle 700, the user vehicle may sense it with distance sensors 191*a* and 191*b* and operate blind spot detection (BSD) to inform the audio output unit 185 so that the other vehicle 510 has approached the user vehicle 700. Accordingly, in addition to the warning that there is the other vehicle 510 in a blind spot, a user may recognize that the position of the other vehicle 510 is within the virtual lane and thus perceive the position of the other vehicle 510 more intuitively.

Also, a lane keeping assist system (LKAS), a lane departure warning system (LDWS), etc. may operate based on the virtual lane.

To this end, the driver assistance apparatus 100 may further include a sensor unit 190. Although it is described in the following that the sensor unit 190 is included in the driver assistance apparatus, it is also possible to use the sensing unit 760 of the vehicle 700 through the interface unit 130.

The sensor unit 190 may include at least one of a distance sensor 191 measuring a distance to an adjacent object, a raindrop sensor 193 measuring an amount of raindrop, and an illumination sensor 195 measuring the brightness around the vehicle 700.

Firstly, the distance sensor 191 may measure a distance to an object adjacent to the vehicle 700 to utilize the measured distance as secondary information for virtual lane generation. For example, by measuring a distance between the other vehicle 510 adjacent to the vehicle or a driving blocking object, such as a curb or median strip and the vehicle 700, the measured distance may be utilized as information that generating virtual lanes that avoids the driving blocking object.

Also, the raindrop sensor 193 may sense rain, snow, etc. to sense the external view of a driver. When an amount of raindrop equal to or greater than a preset value is sensed through the raindrop sensor 193, the processor 170 may determine that it is difficult to identify lanes.

Also, the illumination sensor 195 may sense external illumination to sense the external view of a driver. When a value equal to or less than present illumination is sensed through the illumination sensor 195, the processor 170 may determine that it is difficult to identify lanes.

As such, information sensed with the sensor unit 190 is included in sensor information to be capable of being utilized for virtual lane generation.

Lastly, the driver assistance apparatus 100 may include the processor 170 that controls the overall operations of each unit in the driver assistance apparatus 100.

Specifically, the processor 170 may determine whether lanes are not identified. For example, when objects representing lanes are not detected from image information for a preset time or navigation information provides a driving route having no lanes, it is possible to determine that lanes are not identified.

When the lanes are not identified, the processor 170 may generate virtual lanes based on at least one of navigation information, image information, sensor information and adjacent vehicle information.

Specifically, the processor 170 may generate virtual lanes based on indirect information on the roads around the vehicle among pieces of navigation information. For example, the processor 170 may generate virtual lanes by using the position of the vehicle 700, the width of the road around the vehicle 700, a direction in which a road is extended, etc., as factors.

Also, in case that the position of the vehicle 700 is an unpaved road, the processor 170 may generate virtual lanes based on the current and destination positions of the vehicle 700 among pieces of navigation information.

In addition, the processor 170 may generate virtual lanes based on image information. For example, the processor may generate virtual lanes based on objects corresponding to indirect road signs among pieces of image information.

Also, when a driving blocking object is detected from the driving route of the vehicle 700, the processor 170 may generate virtual lanes to be capable of avoiding it. For example, in case that another vehicle is located on the driving route of the vehicle 700, the processor may generate virtual lanes avoiding it.

Also, in case that the wind shield W is contaminated, the processor 170 may generate virtual lanes based on information on images captured right before contamination. For example, in case that the wind shield W is covered with contaminants and it is temporarily difficult for a driver to identify external situations, the processor 170 may generate virtual lanes based on lanes of image information before the wind shield W is contaminated with the contaminants and a vehicle 700 driving state.

In addition, the processor 170 may generate virtual lanes based on sensor information. For example, the processor 170 may measure a distance to a driving blocking object adjacent to the vehicle 700 and generate virtual lanes to be capable of avoiding it. When it is difficult for a driver to identify lanes, it is often difficult to detect lanes from image information and thus by supplementing it with sensor information, it is possible to assist safe driving.

In addition, the processor 170 may generate virtual lanes based on adjacent vehicle information. For example, the processor 170 may receive virtual lanes generated by the front vehicle and extend the received virtual lanes to the vehicle 700 to generate virtual lanes.

Also, the processor 170 may receive virtual lanes generated by the vehicle 700 on the left or right, and perform calibration on generated virtual lanes with the virtual lanes of the vehicle 700 on the left or right in order to prevent collision with the vehicle 700 on the left or right.

That is, the processor 170 may perform calibration on the generated virtual lanes and the virtual lanes of the adjacent vehicle through a gap with the other vehicle 510 driving on the left and right to share common virtual lanes with the adjacent vehicle. For example, when the generated virtual lanes and the virtual lanes of the vehicle 700 driving on the left and right do not match, the processor 170 may perform calibration on the virtual lanes so that they overlap.

The processor 170 may be implemented by using at least one of an application specific integrated circuit (ASIC), a digital signal processor (DSP), a digital signal processing device (DSPD), a programmable logic device (PLD), a field programmable gate array (FPGA), the processor, a controller, a micro-controller, a microprocessor 170, and electrical units for executing other functions.

In addition, such a processor 170 may be controlled by the control unit or control various functions of the vehicle 700 through the control unit.

FIGS. 10 to 15 are diagrams that describe examples where the driver assistance apparatus 100 according to an embodiment generates and displays virtual lanes.

In the following, the processes of generating and displaying virtual lanes in many situations are described with reference to FIGS. 10 to 15.

Figure 10:
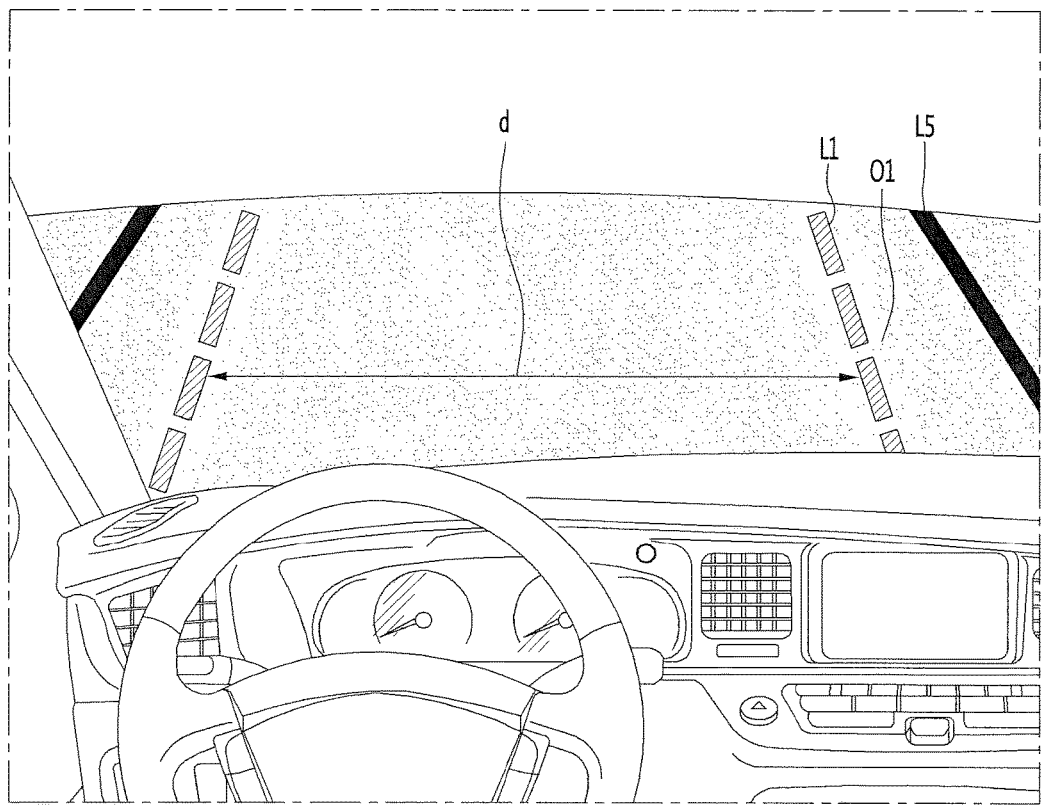
FIGS. 10 to 15 are diagrams that describe examples where a driver assistance apparatus according to an embodiment generates and displays virtual lanes.

Referring to FIG. 10, it may be seen that there is a situation in which it is difficult for the vehicle 700 to identify lanes due to damage to the lanes by driver's frequent driving.

The processor 170 may generate lanes in order to assist a driver when the lanes are not detected or intermittently detected.

In this case, the processor 170 detects an object 01 forming the basis of the virtual lane generation to generate the image information, and generate the virtual lanes according to the image information.

For example, the processor 170 may firstly detect the width of the entire road on which the vehicle 700 may drive. Specifically, the processor 170 may detect a curb, a median strip, the center lane, the wheel track of the front vehicle 700, etc. with image information or the distance sensor 191 and detect the entire road L5 width on which the vehicle 700 may drive, based on the detected information. Then, the processor 170 may detect the object 01 that may be the basis of a lane, or generate a virtual lane L1 based on a general road width.

Then, the processor 170 may display generated virtual lanes L1 and L5 through the display unit 180 to assist a user in driving.

In this case, as shown in FIG. 10, the processor 170 may display, as the virtual lanes L1 and L5, the entire road L5 width on which it is possible to drive and the lane L1 which the vehicle 700 should maintain, together.

Also, the processor 170 may transmit the generated virtual lanes L1 and L5 to adjacent vehicles through the communication unit 120 so that it is possible to prevent the adjacent vehicles from entering the virtual lanes L1 and L5.

Figure 11:
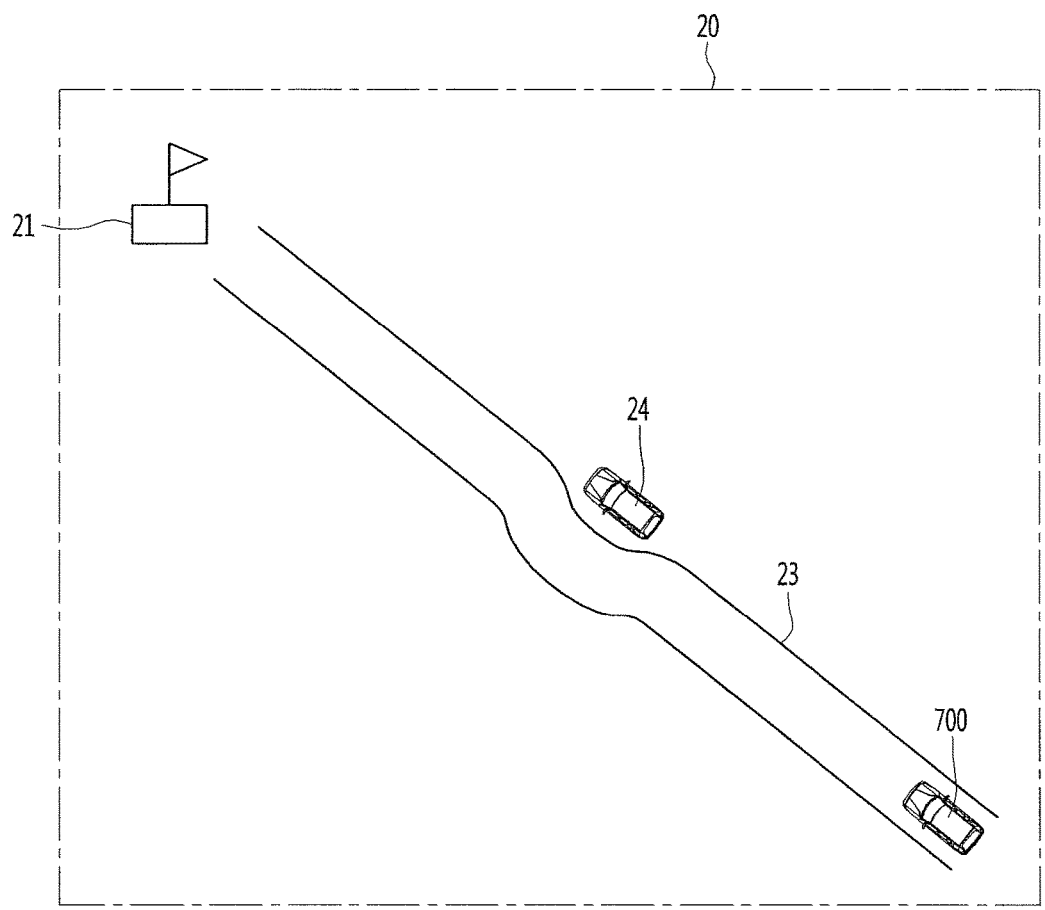

FIG. 11 schematically represents how the processor 170 generates virtual lanes in a driving section where there is no lane such as an unpaved road.

The processor 170 may generate virtual lanes 23 based on the current position of the vehicle 700, the vehicle 700's destination 21, related map information, and the safe driving width of the vehicle 700, through navigation information. Also, when a driving blocking object 24 is detected through image information or sensor information, the processor 170 may generate the virtual lanes 23 to avoid it.

Referring to FIG. 11, the processor 170 may generate the shortest route connecting the position of the current vehicle 700 and the destination 21 as the virtual lanes 23 and then generate the virtual lanes 23 in order to avoid the driving blocking object 24 that is disposed on the shortest route.

The processor 170 may transmit the generated virtual lanes 23 to an adjacent vehicle 24 through the communication unit 120 so that it is possible to prevent the adjacent vehicle 24 from entering the virtual lanes 23.

Figure 12:
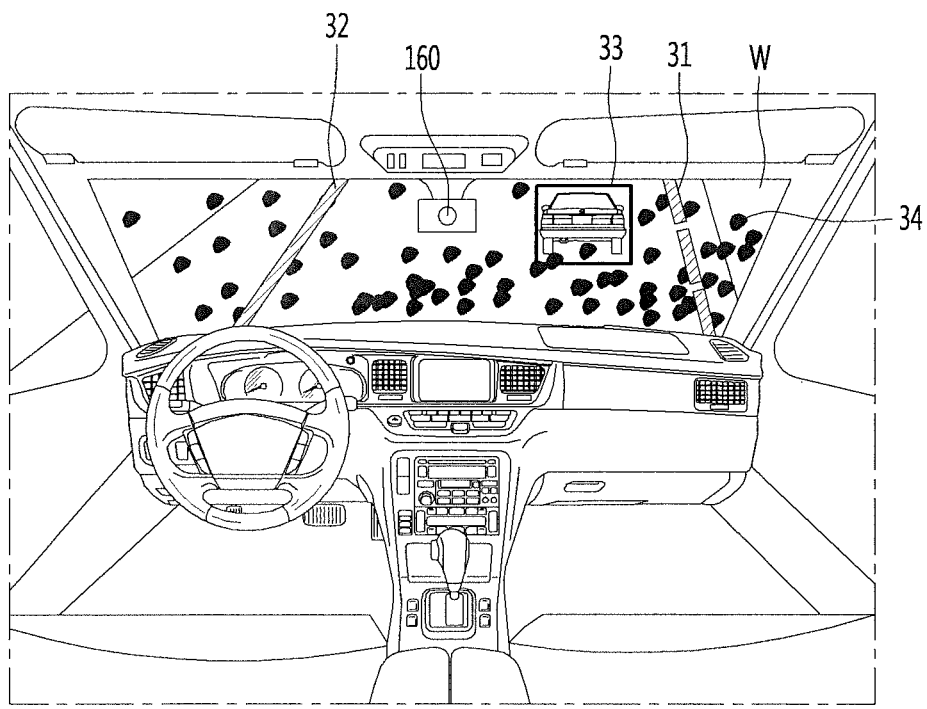

FIG. 12 represents how to generate and display a virtual lane when the wind shield W is contaminated, according to an embodiment.

When the wind shield is temporarily contaminated, the processor 170 may sense it and generate virtual lanes 31 and 32. For example, when it is sensed from image information that there are contaminants 34 on the wind shield W and the contaminants 34 occupy a certain range of the area of the wind shield W, the processor 170 may determined that lanes are not identified.

When it is determined that the lanes are not identified due to the contamination of the wind shield W, the processor 170 may display lanes through image information. Specifically, the processor 170 may generate virtual lanes 31 and 32 based on lanes from image information before the contaminants contaminate the wind shield W and on a vehicle 700 driving state.

In this case, when the driving blocking object is located in the virtual lanes 31 and 32, the processor 170 may detect it by using a distance sensor 191 and generate the virtual lanes 31 and 32 in order to the driving blocking object. For example, when a front vehicle is detected, the processor 170 may calculate a distance to the front vehicle. Then, the processor 170 may generate and output a virtual image 33 to correspond to the distance to the front vehicle.

The processor 170 may transmit the generated virtual lanes 31 and 32 to adjacent vehicles through a communication unit 120 so that it is possible to prevent the adjacent vehicles from entering the virtual lanes 31 and 32.

Figure 13:
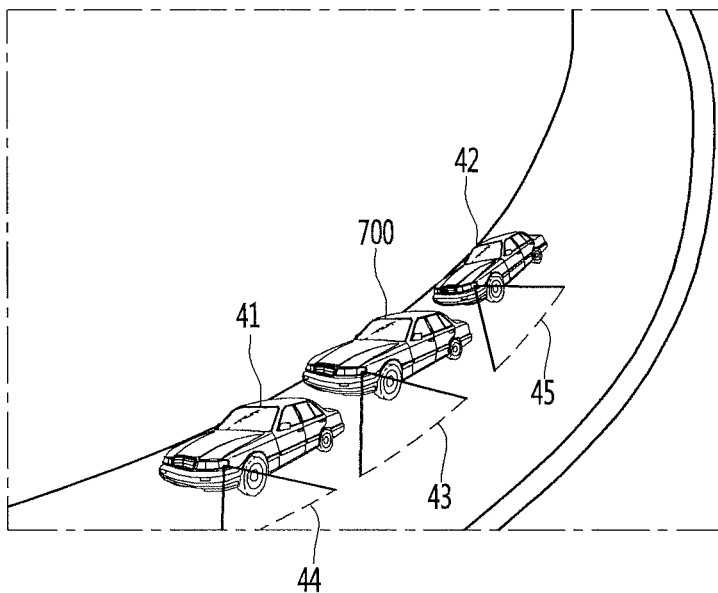

FIG. 13 represents how the light module 183 according to an embodiment displays virtual lanes.

Referring to FIG. 13, in case that there are adjacent vehicles 41 and 42, the processor 170 may share common virtual lanes 43 to 45.

For example, in case that there is a front vehicle 41 and there is the virtual lane 44 generated by the front vehicle 41, it is possible to generate the virtual lane 43 matching the extension direction of the virtual lane 44 of the front vehicle 41.

Specifically, in case that the front vehicle 41 irradiates a laser beam as the virtual lane 44 to the road surface and it is identified from image information, the processor 170 may generate the virtual lane 42 to match the virtual lane 44 of the front vehicle 41.

In this case, the processor may irradiate laser beams to the left and right of the vehicle 700 to display the virtual lane 43 so that a following vehicle 42 may identify the virtual lane 43, and may also deliver the virtual lane 43 through the communication unit 120.

Figure 14:
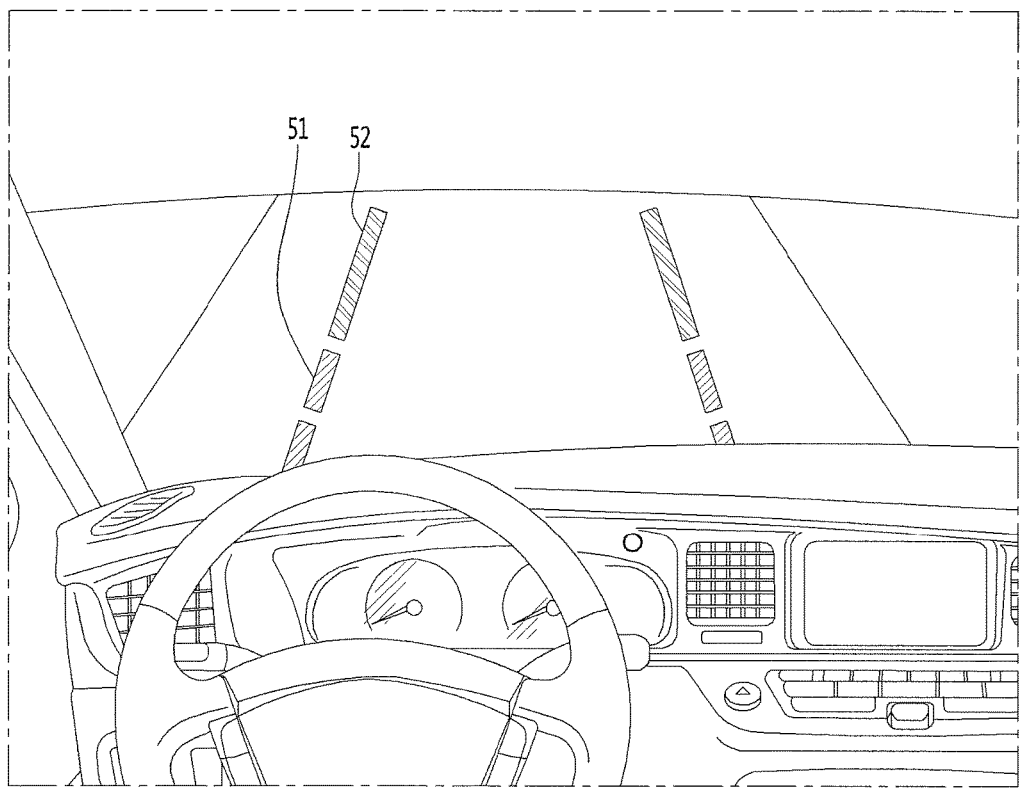

FIG. 14 represents how to display virtual lanes at night according to an embodiment.

Referring to FIG. 14, it is possible to verify that distant lanes are not identified when surrounding illumination is very low at night. When such a situation is detected with an illumination sensor 195 and/or image information, the processor 170 may determine that lanes are not identified, and generate virtual lanes 52.

For example, when the external illumination of the illumination sensor 195 is equal to or less than preset illumination, the processor 170 may determine that lanes are not identified.

In this case, the processor 170 may receive lane objects 51 adjacent to the vehicle 700 from image information and driving route information from navigation information to generate the distant virtual lanes 52.

In addition, the processor 170 may display the distant virtual lanes 52 to allow so that they match the adjacent lanes 51 reflected through the wind shield W, and thus assist a user in driving.

Figure 15:
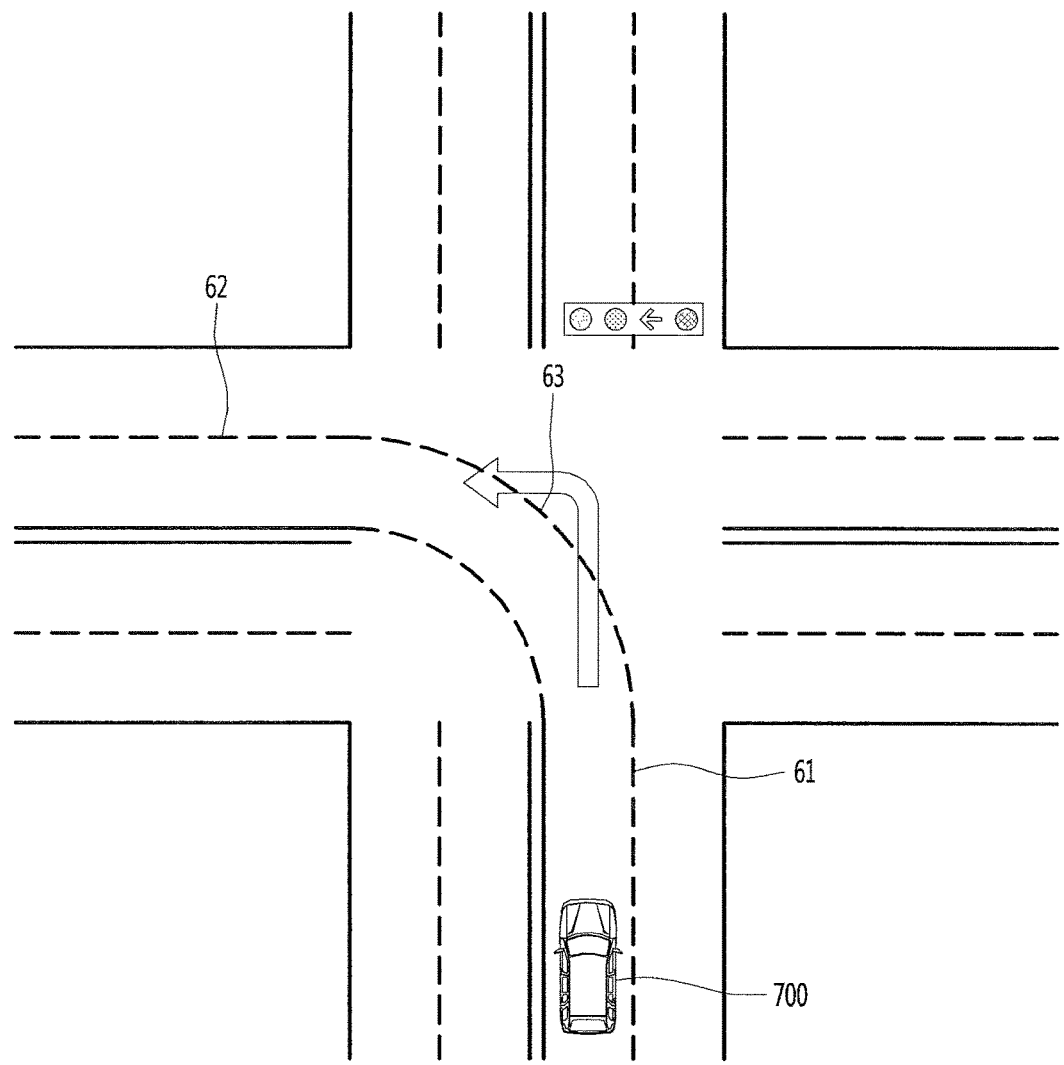

FIG. 15 represents how to display virtual lanes at a crossroad according to an embodiment.

Referring to FIG. 15, when there is a plurality of lanes on which the left turn and/or the right turn are possible, and there is no lane that indicates a turn direction, the driver assistance apparatus 100 may generate and output virtual lanes.

Specifically, the processor 170 may receive map information on the crossroad from navigation information, detect the current traffic lane 61 and a lane 62 after the passing of the crossroad from image information, and generate a virtual lane 63 based on the detected lanes.

In addition, the processor 170 may transmit the generated virtual lane 63 to adjacent vehicles that will drive in the same direction, and thus prevent the adjacent vehicles from entering the virtual lane 63.

As described above through examples, when lanes are not identified while the vehicle 700 drives, there is high risk of traffic accident because a driving route negotiated between vehicles is not defined. The driver assistance apparatus 100 may determine that lanes are not identified, and appropriately generate and display virtual lanes depending on the situation to assist a user in driving. Also, the driver assistance apparatus 100 may deliver the generated virtual lane to the adjacent vehicle to prevent it from entering the virtual lane, so it is possible to prevent an accident.

In the following, the process of generating a virtual lane by the driver assistance apparatus 100 is described in detail with reference to FIGS. 16 to 26.

FIGS. 16 to 20 are diagrams that describe the processes of generating and correcting virtual lanes through communication with an adjacent vehicle according to an embodiment.

Figure 16:
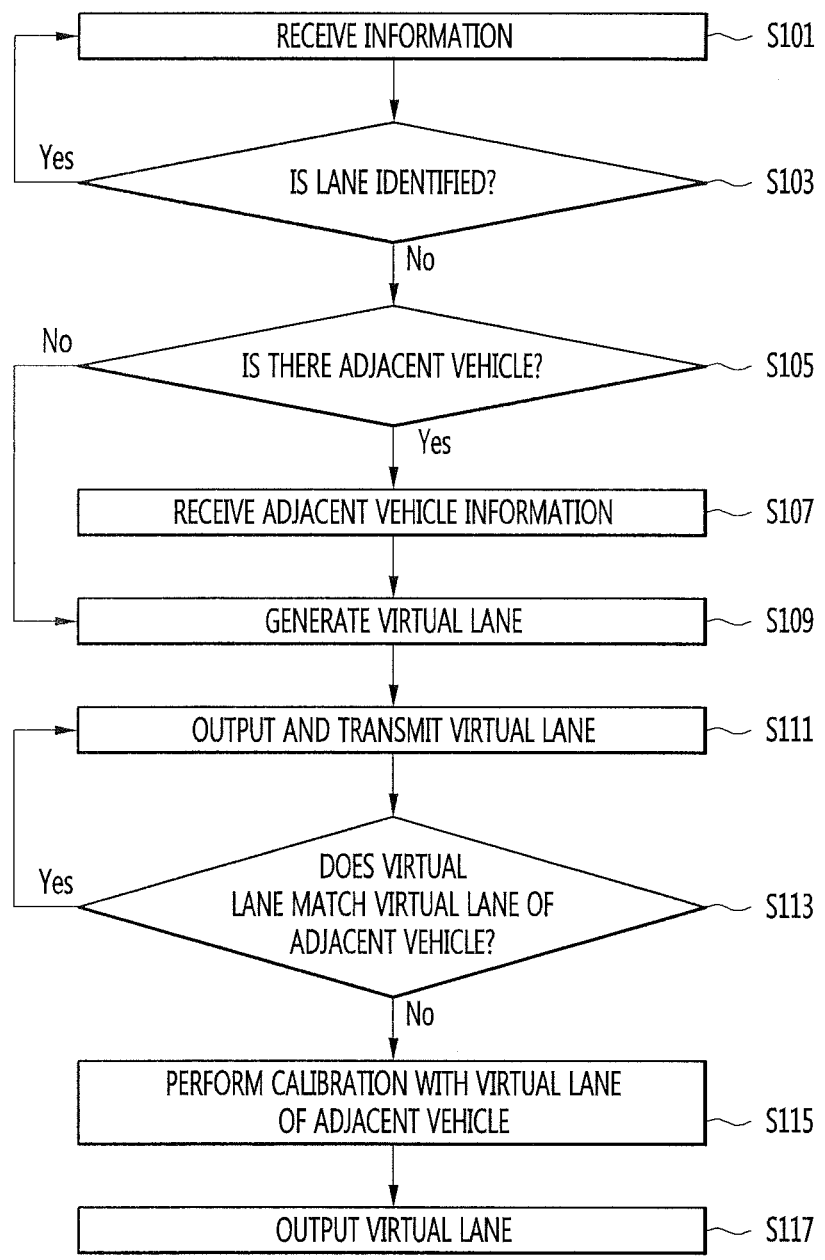
FIGS. 16 to 20 are diagrams that describe the processes of generating and correcting virtual lanes through communication with an adjacent vehicle according to an embodiment.

Referring to FIG. 16, the processor 170 receives at least one of image information, distance information, sensor information, navigation information, secondary information, and adjacent vehicle information in step S101.

In addition, the processor 170 may sense based on the above information whether lanes are not identified, in step S103. For example, when a lane object on image information is incomplete or there is no lane object on image information, when the contamination of the wind shield W is sensed, when sensed illumination is equal to or smaller than a preset value, or when sensed precipitation is equal to or higher than a preset value, the processor 170 may determine that a user has failed to identify lanes.

When the processor 170 determines that lanes are not identified, the vehicle 700 may verify the existence of an adjacent vehicle through image information, distance information and/or adjacent vehicle information, in step S105.

When there is an adjacent vehicle, the processor 170 may receive adjacent vehicle information through a communication unit 120. Also, the processor 170 may also collect information on the adjacent vehicle through a distance sensor 191 and image information in step S107.

Then, the processor 170 may generate virtual lanes based on the above information in step S109.

Figure 17:
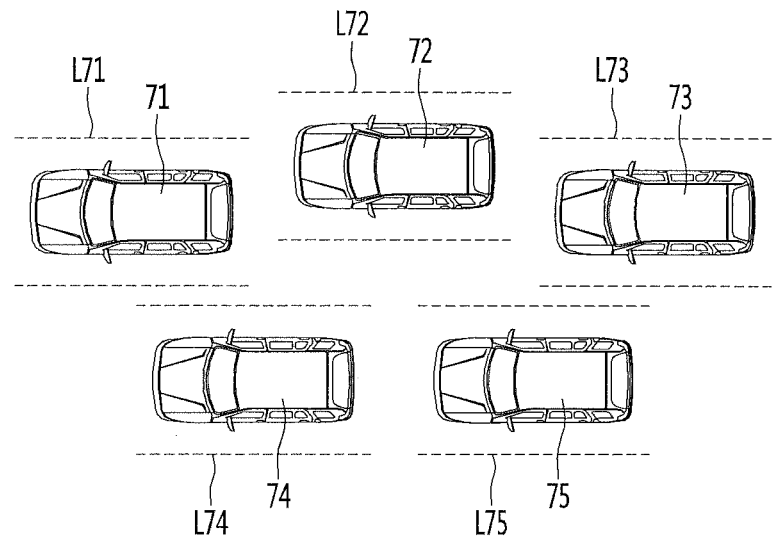

FIG. 17 represents how a plurality of vehicles 71 to 75 generates virtual lanes through at least one of image information, distance information, sensor information, navigation information, secondary information, and adjacent vehicle information. In this case, all of the plurality of vehicles 71 to 75 include the driver assistance apparatus 100.

As could be seen through FIG. 17, lanes L71 to L75 generated by the vehicles 71 to 75, respectively may mismatch. When there are differences among virtual lanes L71 to L75 generated by the vehicles 71 to 75 in this way, there may be high risk of accident.

Figure 18:
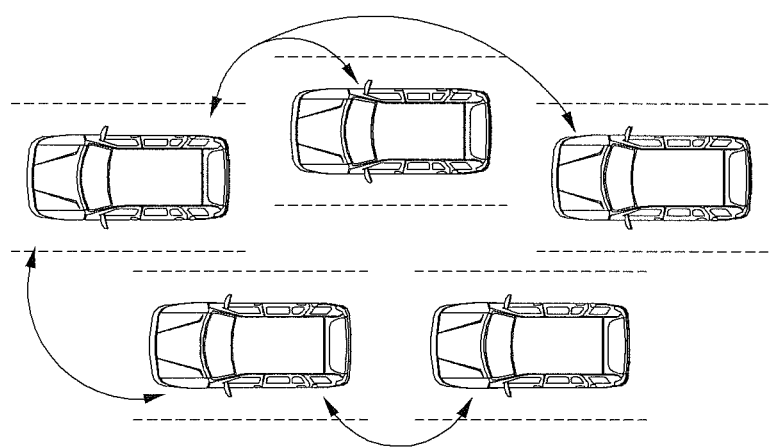

In order to prevent it, the processor 170 may continuously send and receive generated virtual lane L71 to L75 data through the communication unit 120 as shown in FIG. 18, in step S111.

In addition, the processor 170 may determine whether the virtual lanes L71 to L75 of adjacent vehicles match the virtual lanes L71 to L75 generated by the user vehicle 700 in step S113.

When there are differences in virtual lanes L71 to L75 relative to the adjacent vehicles, the processor 170 may send and receive data through the communication unit 120 to perform virtual lane calibration through which common virtual lanes C71 to C75 are generated, in step S115.

Figure 19:
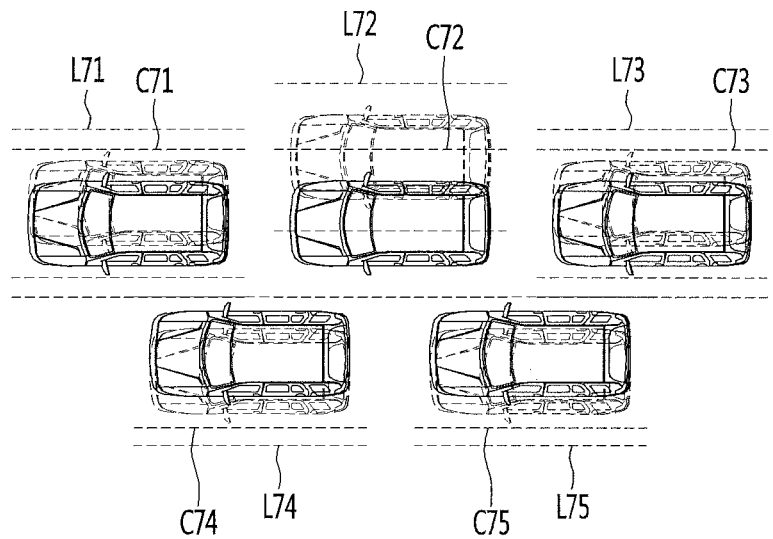

Referring to FIG. 19, it is possible to see the virtual lanes previously generated by the plurality of vehicles 71 to 75 and the virtual lanes C71 to C75 corrected through calibration, and the drivers of the vehicles 71 to 75 may operate the vehicle 700 based on the corrected virtual lanes C71 to C75.

Figure 20:
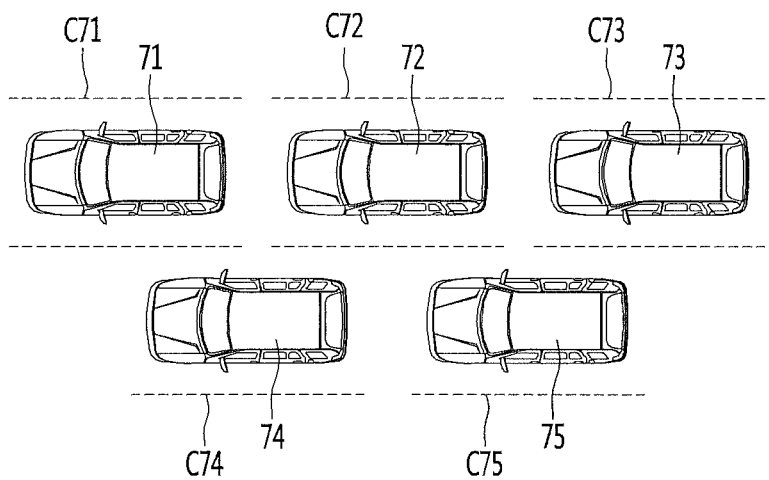

The processor 170 may continuously share virtual lane data with adjacent vehicles in this way to generate and output common virtual lanes C71 to C75 in step S117. Referring to FIG. 20, it is possible to verify that safe driving is possible because a plurality of adjacent vehicles 71 to 75 generates common virtual lanes C71 to C75 and then drives.

FIGS. 21 to 24 are diagrams that describe the processes of generating and outputting virtual lanes based on image information and distance information according to an embodiment.

Figure 21:
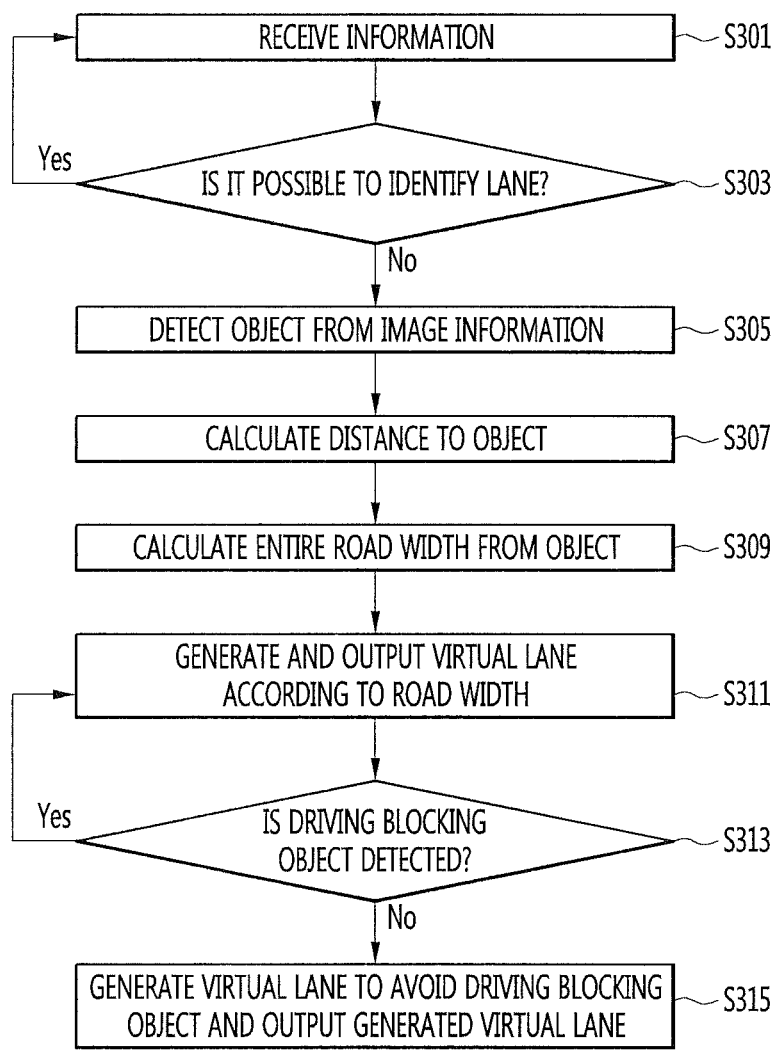
FIGS. 21 to 24 are diagrams that describe the processes of generating and outputting virtual lanes based on image information and distance information according to an embodiment.

Referring to FIG. 21, the processor 170 receives at least one of image information, distance information, sensor information, navigation information, secondary information, and adjacent vehicle information in step S301.

In addition, the processor 170 may sense based on the above information whether lanes are not identified, in step S303. For example, FIG. 12 is a front image captured by a camera 160 and may be possible to see only a portion of a lane due to damage to the lane.

The processor 170 may determine that lanes are not identified when lane objects on image information are incomplete or there is no lane object.

Then, the processor 170 may detect objects around the vehicle 700 from image information. Specifically, the processor 170 may detect information on objects that may be the basis of lane identification in step S305.

Figure 22:
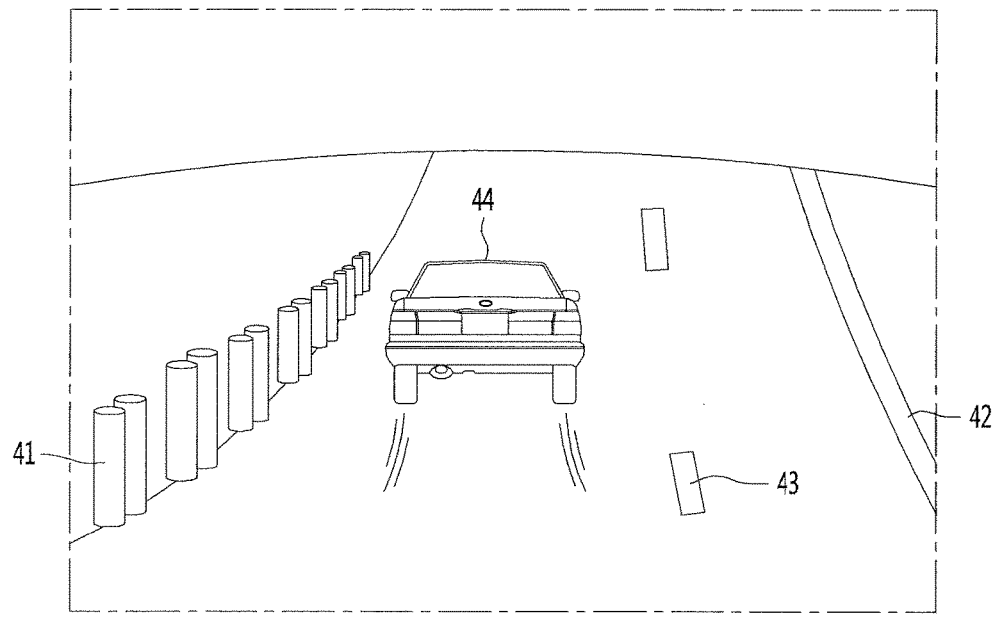

For example, as seen in FIG. 22, a median strip 41, a lane 43, a curb 42, etc. may be the basis of lane identification.

In addition, the processor 170 may measure and calculate a distance between the detected object and the vehicle 700 with a distance sensor 191 in step S307.

In addition, the processor 170 may calculate the entire road width that the vehicle 700 may drive, based on the distance to the object around the vehicle 700 in step S309. For example, in FIG. 22, the median strip 41 is set as the leftmost road 46 where the vehicle 700 may drive and the curb 42 is set as the rightmost road where the vehicle 700 may drive so that it is possible to generate the maximum-wide virtual road where the vehicle 700 may drive.

Then, the processor 170 may generate and output the virtual lane 46 based on the calculated entire road width in step S311.

Figure 23:
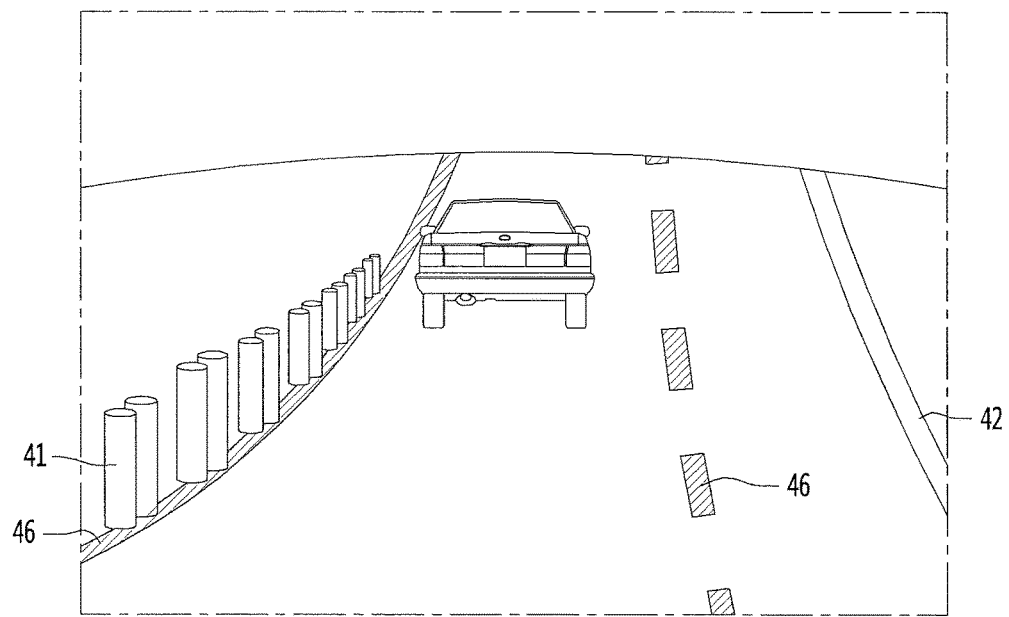

Referring to FIG. 23, it may be seen that the virtual lane 46 is generated and displayed along the median strip 41 and the right virtual lane 46 is generated based on the safe driving width of the vehicle 700.

Next, the processor 170 may detect a driving blocking object 47 disposed at the virtual lane 46 in step S313.

Next, when the driving blocking object 47 is detected, the processor 170 may correct the virtual lane 46 in order to be capable of avoiding the object and output the corrected virtual lane, in step S315.

Figure 24:
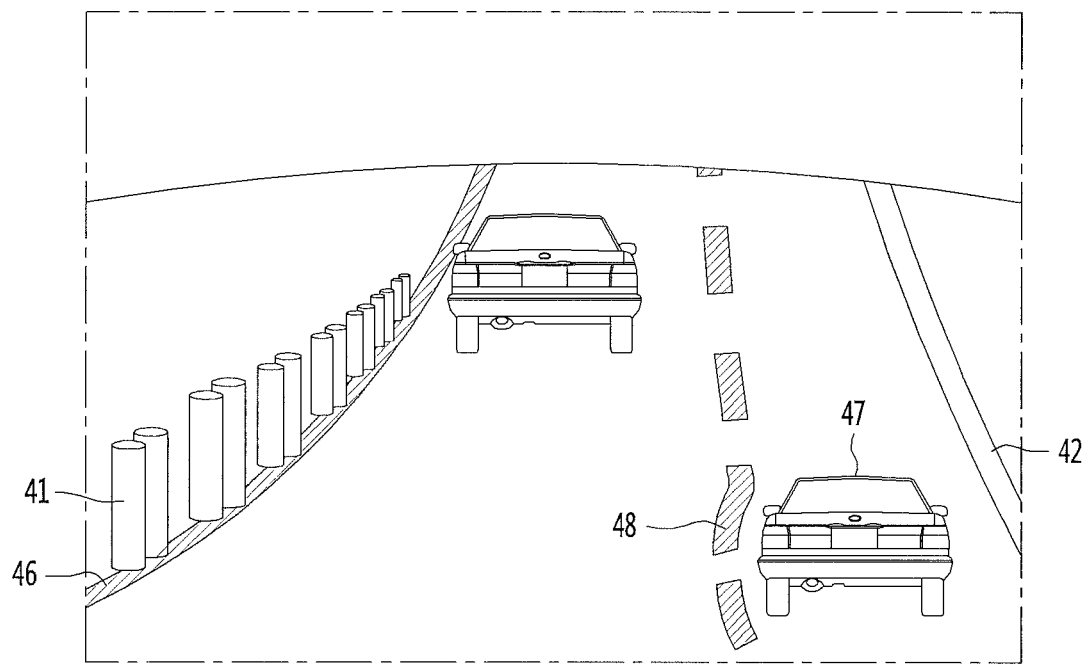

Referring to FIG. 24, it is possible to see that another vehicle 47 approaches the virtual lane 46 and the corrected virtual lane 48 is generated. That is, the processor 170 may correct the virtual lane 46 in real time and output the corrected virtual lane 48 to allow safe driving.

Figure 25:
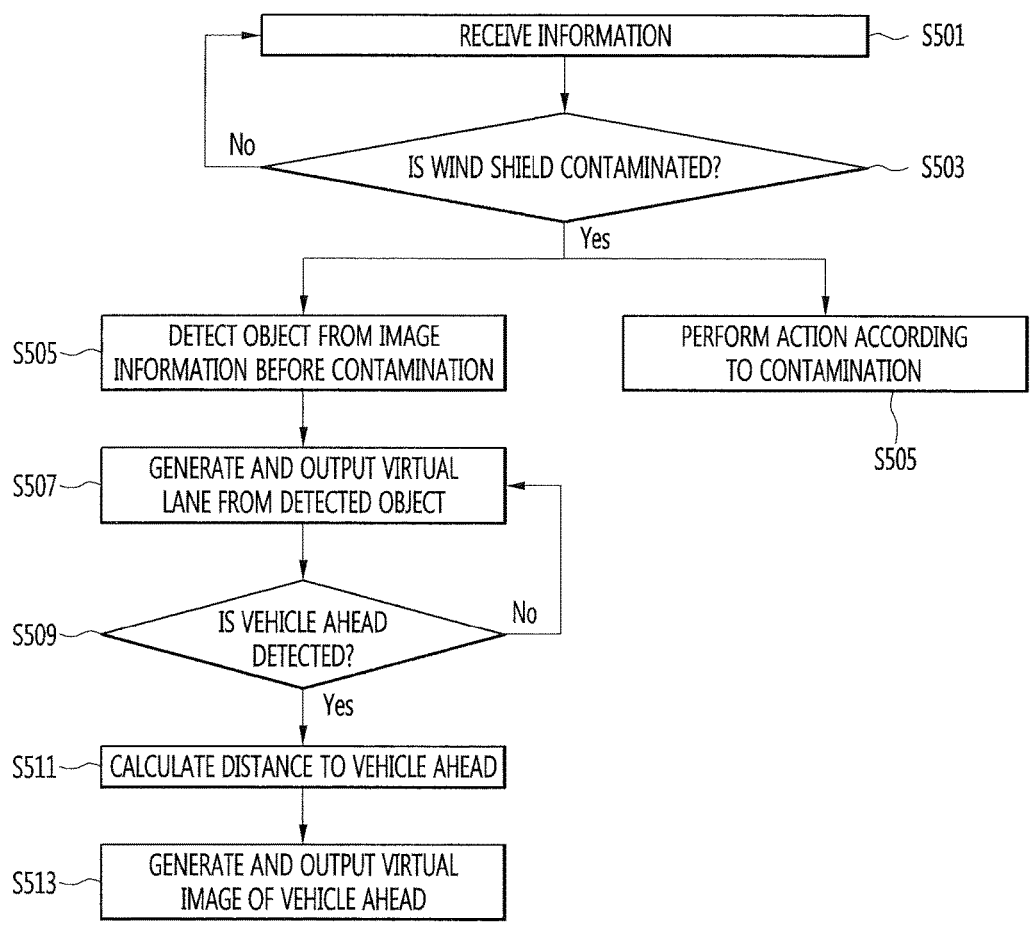
FIGS. 25 to 27 are diagrams that describe the processes of generating and outputting virtual lanes based on image information and distance information according to an embodiment.
Figure 26:
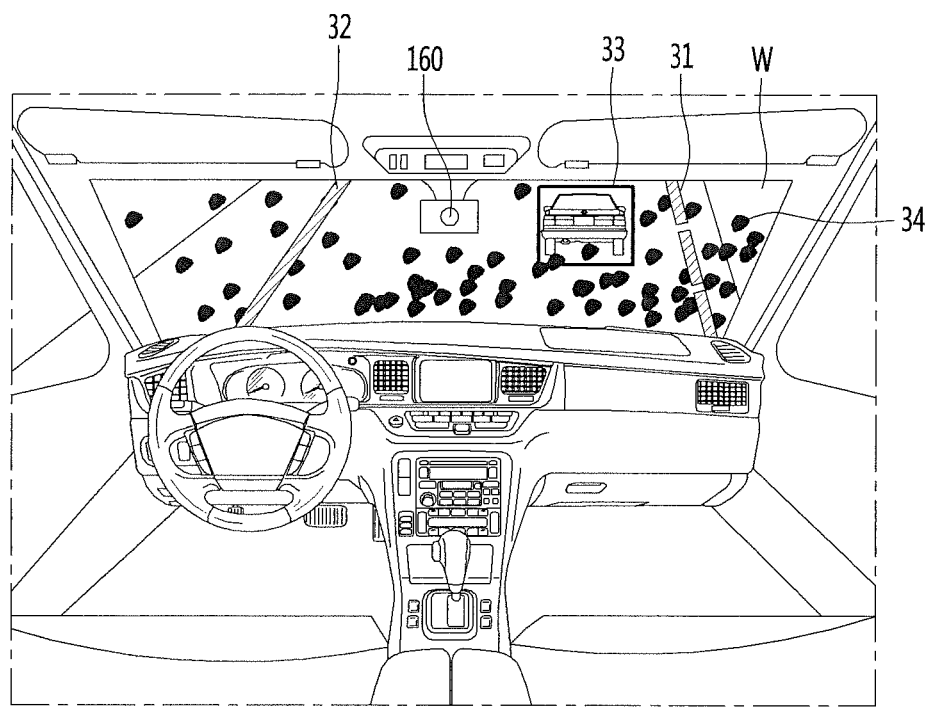

FIGS. 25 to 26 are diagrams that describe the processes of generating and outputting virtual lanes based on image information and distance information according to an embodiment.

Referring to FIGS. 25 and 26, the processor 170 receives at least one of image information, distance information, sensor information, navigation information, secondary information, and adjacent vehicle information in step S501.

In addition, the processor 170 may sense based on the above information whether lanes are not identified, in step S503. For example, referring to FIG. 26, the processor 170 may determine with a front image captured by a camera 160 whether the wind shield W has been contaminated.

If the contamination of the wind shield W is sensed, the processor 170 may generate a signal that performs an action for removing the contamination depending on the contamination. For example, the processor 170 may generate a signal for operating a wiper if the window of the vehicle 700 is contaminated by raindrop. Alternatively, the processor 170 may generate a signal for spraying wind shield W washer fluid along with the signal for operating the wiper if the wind shield W is contaminated by contaminants such as soil.

In addition, the processor 170 may generate virtual lanes based on the above information.

Specifically, the processor 170 may firstly generate and output virtual lanes based on image information before contamination among pieces of image information in steps S505 and S507.

For example, in case that the wind shield W is covered with contaminants and it is temporarily difficult for a driver to identify external situations, the processor 170 may generate virtual lanes based on lanes of image information before the wind shield W is contaminated with the contaminants and a vehicle 700 driving state, and display the generated virtual lanes on the wind shield W.

Next, the processor 170 may detect whether there are driving blocking objects on the virtual lanes in step S509. For example, the processor 170 may verify whether there is a front vehicle, through a distance sensor 191 and/or image information.

If front vehicle is detected, the processor 170 may calculate a distance to the front vehicle in step S511.

Then, the processor 170 may generate and output a virtual image to correspond to the distance to the front vehicle in step S513.

Referring to FIG. 26, it is possible to see that the wind shield W is contaminated by contaminants, thus it is determined that it is difficult to identify virtual lanes, and virtual lanes 31 and 32 and a virtual image 33 corresponding to the front vehicle are displayed on the wind shield W.

As described above, the driver assistance apparatus 100 may determine whether lanes are not identified, generate virtual lanes based on appropriate information depending on the situation, and output the generated virtual lanes to assist user's safe driving. Also, it is possible to share the generated virtual lanes with adjacent vehicles to prevent accidents between vehicles.

Figure 27:
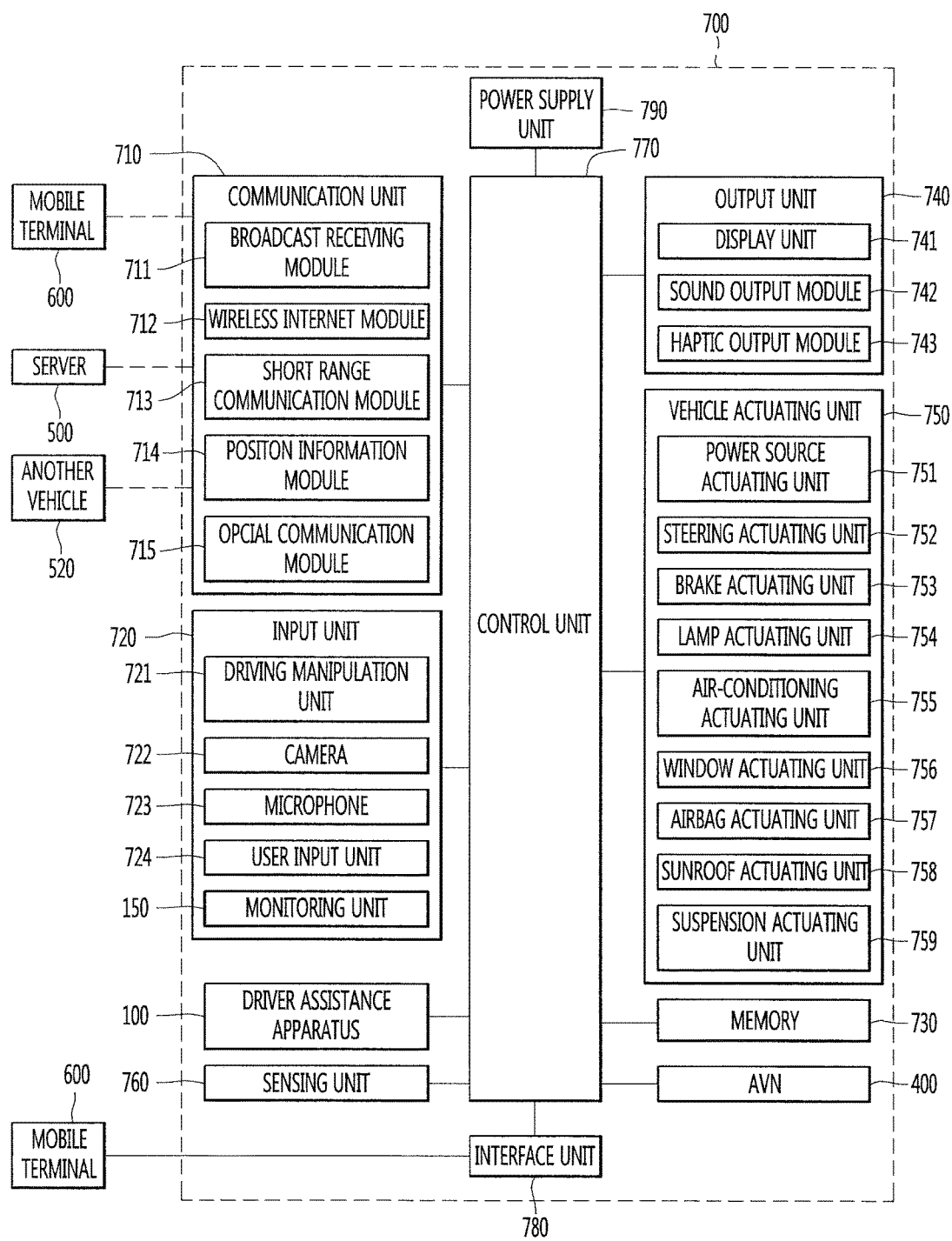

FIG. 27 is an example of an internal block diagram of the vehicle of FIG. 1.

Such a driver assistance apparatus may be included in the vehicle 700.

The vehicle may include a communication unit 710, an input unit 720, a sensor unit 760, an output unit 740, a vehicle actuating unit 750, a memory 730, an interface unit 780, a control unit 770, a power supply unit 790, a driver assistance apparatus 100, and an AVN apparatus 400.

The communication unit 710 may include one or more modules that enable wireless communication between the vehicle and the mobile terminal 600, between the vehicle 700 and an external sever 510, or between the vehicle 700 and another vehicle 520. Also, the communication unit 710 may include one or more modules that connect the vehicle to one or more networks.

The communication unit 710 may include a broadcast receiving module 711, a wireless internet module 712, a short-range communication module 713, a position information module 714, and an optical communication module 715.

The broadcast receiving module 711 receives a broadcast signal or broadcast related information from an external broadcast management server through a broadcast channel. In this example, a broadcast include a radio or TV broadcast.

The wireless internet module 712 indicates a module for wireless internet access and may be built into or external to the vehicle. The wireless internet module 712 is configured to transmit/receive a wireless signal in a communication network according to wireless internet technologies.

The wireless internet technology may include Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A) and the wireless internet module 712 transmits/receives data according to at least one wireless internet technology including internet technologies not listed above. For example, the wireless internet module 712 may exchange data with the external server 510 wirelessly. The wireless internet module 712 may receive weather information or road traffic information (e.g., TPEG) from the external server 510.

The short-range communication module 713 may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (Wireless USB) technologies.

Such a short-range communication module 713 may form a Wireless Area Network (WAN) to perform short-range communication between the vehicle and at least one external device. For example, the short-range communication module 713 may exchange data with the mobile terminal 600. The short-range module 713 may receive weather information or road traffic information (e.g., TPEG) from the mobile terminal 600. If a user gets in the vehicle, the mobile terminal 600 of the user and the vehicle may perform pairing on each other automatically or by the execution of an application by the user.

The position information module 714 is a module for acquiring the position of the vehicle and includes a GPS module as a typical example. For example, the vehicle may use a signal transmitted by a GPS satellite to acquire the position of the vehicle, when the GPS module is used.

The optical communication module 715 may include a light transmission unit and a light reception unit.

The light reception unit may convert a light signal into an electrical signal to receive information. The light reception unit may include a photo diode (PD) for receiving light. The PD may convert light into an electrical signal. For example, the light reception unit may receive information on the front vehicle through light emitted from a light source that is included in the front vehicle.

The light transmission unit may include at least one light-emitting element for converting an electrical signal into a light signal. In this example, the light-emitting element may be a light-emitting diode (LED). The light transmission unit may convert an electrical signal into a light signal to transmit the light signal to the outside. For example, the light transmission unit may transmit the light signal to the outside through the on/off of the light-emitting element corresponding to a predetermined frequency. According to an embodiment, the light transmission unit may include a plurality of light-emitting element arrays. According to an embodiment, the light transmission unit may be integrated into a lamp that is installed at the vehicle. For example, the light transmission unit may be at least one of a headlight, a taillight, a stop lamp, a turn signal, and a sidelight. For example, the optical communication module 715 may exchange data with the other vehicle 520 through optical communication.

The input unit 720 may include the driving manipulation means 721, a camera 195, a microphone 723, and a user input unit 724.

The driving manipulation means 721 receives a user input for driving the vehicle. (See FIG. 2 for the following description.) The driving manipulation means 721 may include the steering input means 721A, a shift input means 721D, an acceleration input means 721C, and a brake input means 721B.

The steering input means 721A receives an input for the driving direction of the vehicle from a user. The steering input means 721A may be formed in the form of a wheel so that a steering input may be performed by rotation. According to an embodiment, the steering input means 721A may also be formed as a touch screen, touch pad or button.

The shift input means 721D receives an input for the parking P, driving D, neutrality N, and rear movement R of the vehicle from the user. The shift input means 721D may be formed in the form of a lever. According to an embodiment, the shift input means 721D may also be formed as a touch screen, touch pad or button.

The acceleration input means 721D receives a n input for the acceleration of the vehicle from the user. The brake input means 721B receives an input for the speed decrease of the vehicle from the user. The acceleration input means 721C and the brake input means 721B may be formed in the form of a pedal. According to an embodiment, the acceleration input means 721C or the brake input means 721B may also be formed as a touch screen, touch pad or button.

The camera 722 may include an image sensor and an image processing module. The camera 722 may process a still image or video that is obtained by an image sensor (e.g., CMOS or CCD). The image processing module may process the still image or video acquired by the image sensor to extract necessary information and transmit the extracted information to the processor 770. The vehicle may include the camera 722 that captures images in front of the vehicle or images around the vehicle, and the monitoring unit 150 that captures an image of the interior of the vehicle.

The monitoring unit 150 may acquire an image of a passenger. The monitoring unit 150 may acquire the image of the passenger for biometrics.

Although FIG. 27 shows that the monitoring unit 150 and the camera 722 are included in the input unit 720, the camera 722 may also be included in the driver assistance apparatus as described above.

The microphone 723 may process an external sound signal into electrical data. The processed data may be used in various methods according to a function that is executed at the vehicle. The microphone 723 may convert a user's voice command into electrical data. The electrical data obtained through conversion may be transmitted to the control unit 770.

According to an embodiment, the camera 722 or the microphone 723 may also be a component that is included in the sensing unit 760, and not in the input 720.

The user input unit 724 receives information from the user. When information is input through the user input unit 724, the control unit 770 may control the operation of the vehicle corresponding to the input information. The user input unit 724 may include a touch-type input means or mechanical input means. According to an embodiment, the user input unit 724 may be disposed at a region of a steering wheel. In this case, a driver may manipulate the user input unit 724 with his or her finger, holding the steering wheel.

The sensing unit 760 senses a signal relating to the driving of the vehicle. To this end, the sensing unit 760 may include a wheel sensor, a speed sensor, a tilt sensor, a weight sensor, a heading sensor, a yaw sensor, a gyro sensor, a position module, a vehicle forward/backward movement sensor, a battery sensor, a fuel sensor, a tire sensor, a steering sensor by steering wheel rotation, a vehicle temperature sensor, a vehicle humidity sensor, an ultrasonic sensor, a radar, a Lidar, and so on.

Thus, the sensing unit 760 may acquire sensing signals for vehicle collision information, vehicle direction information, vehicle position information (GPS information), vehicle angle information, vehicle speed information, vehicle acceleration information, vehicle tilt information, vehicle forward/backward movement information, battery information, fuel information, tire information, vehicle lamp information, vehicle temperature information, vehicle humidity information, steering wheel rotation angle, and so on.

The sensing unit 760 may further include an acceleration pedal sensor, a barometric pressure sensor, an engine speed sensor, an Air Flow Sensor (AFS), an Air Temperature Sensor (ATS), a Water Temperature Sensor (WTS), a Throttle Position Sensor (TPS), a TDC sensor, a Crank Angle Sensor (CAS), and so on.

The sensing unit 760 may include a biometric recognition information sensing unit. The biometric recognition information sensing unit senses and acquires biometric recognition information on a passenger. The biometric recognition information may include fingerprint information, iris-scan information, retina-scan information, hand geometry information, facial recognition information, and voice recognition information. The biometric recognition information sensing unit may include a sensor that senses biometric recognition information of the passenger. In this case, the monitoring unit 150 and the microphone 723 may operate as sensors. The biometric recognition information sensing unit may acquire hand geometry information and facial recognition information through the monitoring unit 150.

The output unit 740 is used for outputting information processed by the control unit 770 and may include the display unit 741, the sound output unit 742, and the haptic output unit 743.

The display unit 741 may display information processed by the control unit 770. For example, the display unit 741 may display vehicle related information. In this example, the vehicle related information may include vehicle control information for direct control over the vehicle or driver assistance information for a driving guide for a driver. Also, the vehicle related information may include vehicle state information that indicates the current state of the vehicle, or vehicle operation information relating to the operation of the vehicle.

The display unit 741 may include at least one of an LCD, a TFT LCD, an OLED, a flexible display, a 3D display, and an e-ink display.

The display unit 741 may form a mutual layer structure with a touch sensor or be integrally formed to implement a touch screen. The touch screen may function as the user input unit that provides an input interface between the vehicle and the user, and also provide an output interface between the vehicle and the user. In this case, the display unit 741 may include a touch sensor sensing a touch of the display unit 741 to be capable of receiving a control command by the touch. Accordingly, when the display unit 741 is touched, the touch sensor senses the touch, and the control unit 770 may generate, based on the touch, a control command corresponding to the touch. A thing input by the touch may be a letter, a number, or a menu item that may be instructed or designated in various modes.

The display unit 741 may include a cluster so that a driver may see vehicle state information or vehicle operation information simultaneously with driving. The cluster may be located on the dashboard. In this case, the driver may see information displayed on the cluster, maintaining forward view.

According to an embodiment, the display unit 741 may be implemented as a HUD. When the display unit 741 is implemented as the HUD, it is possible to output information through a transparent display that is installed on the windshield. Alternatively, the display unit 741 may include a projection module to output information by using image that is projected onto the windshield.

The sound output unit 742 converts an electrical signal from the control unit 770 into an audio signal and outputs the audio signal. To this end, the sound output unit 742 may include a speaker and so on. The sound output unit 742 may also output sound corresponding to the operation of the user input unit 724.

The haptic output unit 743 generates a haptic output. For example, the haptic output unit 743 may enable a steering wheel, a safety belt and a seat to vibrate so that a user may recognize an output.

The vehicle actuating unit 750 may control the operations of various apparatuses of the vehicle. The vehicle actuating unit 750 may include a power source actuating unit 751, a steering actuating unit 752, a brake actuating unit 753, a lamp actuating unit 754, an air-conditioning actuating unit 755, a window actuating unit 756, an airbag actuating unit 757, a sunroof actuating unit 758, and a suspension actuating unit 759.

The power source actuating unit 751 may perform electronic control over the power source in the vehicle.

For example, when the power source is a fossil fuel based engine (not shown), the power source actuating unit 751 may perform electronic control over the engine. Thus, it is possible to control the output torque of the engine. When the power source actuating unit 751 is the engine, it is possible to restrict the output torque of the engine to restrict the speed of the vehicle.

As another example, when the power source is an electricity based motor (not shown), the power source actuating unit 751 may control the motor. Thus, it is possible to control the speed, torque and so on of the motor.

The steering actuating unit 752 may perform electronic control over a steering apparatus in the vehicle. Thus, it is possible to change the driving direction of the vehicle.

The brake actuating unit 753 may perform electronic control over a brake apparatus (not shown) in the vehicle. For example, it is possible to control the operation of a brake installed at a wheel to decrease the speed of the vehicle. As another example, by enabling brakes disposed at the left wheel and the right wheel respectively to perform different operations, it is possible to adjust the driving direction of the vehicle to the left or to the right.

The lamp actuating unit 754 may control the turn on/off of lamps that are disposed inside and outside the vehicle. Also, it is possible to control the intensity, direction and so on of light emitted from the lamp. For example, it is possible to control a turn signal lamp, a brake lamp, and so on.

The air-conditioning actuating unit 755 may perform electronic control over an air conditioner (not shown) in the vehicle. For example, when the temperature inside the vehicle is high, it is possible to operate the air conditioner so that cold air is supplied into the vehicle.

The window actuating unit 756 may perform electronic control over a window apparatus in the vehicle. For example, it is possible to open or close left and right windows of the vehicle.

The airbag actuating unit 757 may perform electronic control over an airbag apparatus in the vehicle. For example, it is possible to operate an airbag in a risky situation.

The sunroof actuating unit 758 may perform electronic control over a sunroof apparatus (not shown) in the vehicle. For example, it is possible to open or close the sunroof.

The suspension actuating unit 759 may perform electronic control over a suspension apparatus (not shown) in the vehicle. For example, when the road surface is uneven, it is possible to control a suspension apparatus to reduce the vibration of the vehicle.

The memory 730 is electrically connected to the control unit 770. The memory 770 may store fundamental data on units, control data for operation control over the units, and input and output data. The memory 790 may be various storage devices, such as a ROM, RAM, EPROM, flash drive, and hard drive that are hardware. The memory 730 may store various pieces of data for the overall operations of the vehicle, such as programs for processing or controlling by the control unit 770.

The interface 730 may function as a path to various kinds of external devices that are connected to the vehicle. For example, the interface unit 780 may include a port connectable to the mobile terminal 600 and be connected to the mobile terminal 600 through the port. In this case, the interface unit 780 may exchange data with the mobile terminal 600.

The interface unit 780 may function as a path through which electrical energy is supplied to the mobile terminal 600. When the mobile terminal 600 is electrically connected to the interface unit 780, the interface unit 780 supplies electrical energy supplied from the power supply unit 790 to the mobile terminal 600 according to the control of the control unit 770.

The control unit 770 may control the overall operation of each unit in the vehicle. The control unit 770 may be named an electronic control unit (ECU).

Such a control unit 770 may execute a function corresponding to a transmitted signal, according to the execution signal transmission of the driver assistance apparatus 100.

The control unit 770 may be implemented by using at least one of an ASIC, a DSP, a DSPD, a PLD, an FPGA, a processor, a controller, a micro-controller, a microprocessor, and other electrical units for executing functions.

The control unit 770 may perform the role of the above-described processor 170. That is, the processor 170 of the driver assistance apparatus 100 may be set directly to the control unit 770 of the vehicle. In such an embodiment, it may be understood that the driver assistance apparatus 100 refers to some components of the vehicle.

Alternatively, the control unit 770 may also control components to transmit information requested by the processor 170.

The power supply unit 790 may supply power required for the operation of each component according to the control of the control unit 770. In particular, the power supply unit 770 may receive power from a battery (not shown) in the vehicle.

The AVN apparatus 400 may exchange data with the control unit 770. The control unit 770 may receive navigation information from the AVN apparatus 400 or a separate navigation apparatus (not shown). In this example, the navigation information may include set destination information, route information according to the destination, vehicle driving related map information, or vehicle position information.

Since the driver assistance apparatus according to an embodiment proposes a function necessary for a user depending on a driving situation, maintain user's driving attention, and may be easily performed, there are advantages in that safe driving is possible and it is possible to increase the convenience of the driver.

Specifically, the driver assistance apparatus according to an embodiment may enhance driving safety by providing a partial self-driving function of performing special driving that a user has a difficulty.

Also, since the driver assistance apparatus according to an embodiment may receive an execution input through a gesture input unit, a user may easily perform various execution inputs, maintaining driving attention.

Also, the driver assistance apparatus according to an embodiment proposes a necessary function through a display unit, in which case the driver assistance apparatus enables a convenience function to be intuitively understood with a simple display and also enhances driving safety because the user may keep eyes forward.

The driver assistance apparatus may determine whether lanes are not identified, generate virtual lanes based on appropriate information depending on the situation, and output the generated virtual lanes to assist user's safe driving.

Also, the driver assistance apparatus according to an embodiment may share the generated virtual lanes with adjacent vehicles to prevent accidents between vehicles.

The characteristics, structures, and effects described in the embodiments above are included in at least one embodiment but are not limited to one embodiment. Furthermore, the characteristic, structure, and effect illustrated in each embodiment may be combined or modified for other embodiments by a person skilled in the art. Thus, it would be construed that contents related to such a combination and such a variation are included in the scope of embodiments.

Embodiments are mostly described above. However, they are only examples and do not limit the inventive concept. A person skilled in the art may appreciate that many variations and applications not presented above may be implemented without departing from the essential characteristic of embodiments. For example, each component particularly represented in embodiments may be varied. In addition, it should be construed that differences related to such a variation and such an application are included in the scope of the inventive concept defined in the following claims.

What is claimed is:

1. A driver assistance apparatus comprising:
   a processor configured to:
   obtain at least one of:
   from a camera connected to a vehicle, image information that includes one or more images around the vehicle,
   from a sensor unit connected to the vehicle, sensor information that includes at least one of a distance from the vehicle to an object outside of the vehicle or viability of lanes around the vehicle,
   from a navigation device, navigation information that includes at least one of a destination of the vehicle, route information to the destination, or map information, or
   from an adjacent vehicle, adjacent vehicle information that includes at least one of a position of the adjacent vehicle, a speed of the adjacent vehicle, a driving direction of the adjacent vehicle,
   identify at least one lane based on at least one of the image information, the sensor information, the navigation information, or the adjacent vehicle information, and
   based on at least one lane not being identified, generate virtual lane information that indicates a driving path of the vehicle;
   an output unit configured to output one or more virtual lanes based on the generated virtual lane information; and
   a communication unit configured to transmit the virtual lane information of the vehicle to other vehicles within a certain distance from the vehicle and to receive virtual lane information of the other vehicles from the other vehicles within the certain distance from the vehicle,
   wherein the one or more virtual lanes include a first virtual lane indicating the driving path of the vehicle and a second virtual lane indicating a driving path of one of the other vehicles,
   wherein the processor is further configured to cause the output unit to display both of the first virtual lane and the second virtual lane, and
   wherein the processor is further configured to perform calibration to match the first virtual lane to the second virtual lane determined based on the received virtual lane information of the other vehicles.

2. The driver assistance apparatus according to claim 1,
   wherein the driver assistance apparatus includes the camera that is configured to capture the one or more images around the vehicle and the sensor unit that is configured to output the sensor information,
   wherein the communication unit is further configured to receive the navigation information and the adjacent vehicle information, and wherein the driver assistance apparatus further comprises:
- a distance sensor configured to sense a distance between the vehicle and objects around the vehicle to acquire distance information,
- an interface unit configured to receive the outputted sensor information, and
- a memory configured to store at least one of the image information, the sensor information, the navigation information, the adjacent vehicle information, or the distance information.

3. The driver assistance apparatus according to claim 1, wherein the output unit comprises a display unit that is a head up display, the head up display being configured to display, on a windshield, the one or more virtual lanes as an augmented reality image that corresponds to an external image that is reflected through the windshield.

4. The driver assistance apparatus according to claim 1, wherein the output unit comprises a light module that is configured to irradiate light to a road surface around the vehicle to display the one or more virtual lanes.

5. The driver assistance apparatus according to claim 1, wherein the output unit comprises an audio output unit that is configured to output sound informing that an object is sensed in the one or more virtual lanes.

6. The driver assistance apparatus according to claim 1, further comprising a raindrop sensor configured to sense precipitation, wherein the processor is configured to, based on the sensed precipitation being equal to or higher than a preset value, determine that at least one lane is not identified, generate the virtual lane information, and output the one or more virtual lanes based on the generated virtual lane information through the output unit.

7. The driver assistance apparatus according to claim 1, further comprising a camera configured to capture one or more images around a vehicle to thereby acquire the image information, wherein the processor is configured to, based on one or more lane objects being incomplete or missing, process the one or more images, determine that at least one lane is not identified, generate the virtual lane information, and output the one or more virtual lanes based on the generated virtual lane information through the output unit.

8. The driver assistance apparatus according to claim 1, wherein the driver assistance apparatus includes the camera that is configured to capture the one or more images around the vehicle to thereby acquire the image information, and
wherein the processor is configured to, based on sensing contamination of a windshield, process the one or more images, determine that at least one lane is not identified, generate the virtual lane information, and output the one or more virtual lanes based on the generated virtual lane information through the output unit.

9. The driver assistance apparatus according to claim 1, further comprising an illumination sensor configured to sense illumination around a vehicle, wherein the processor is configured to, based on the sensed illumination being equal to or lower than a preset value, determine that at least one lane is not identified, generate the virtual lane information, and output the one or more virtual lanes based on the generated virtual lane information through the output unit.

10. The driver assistance apparatus according to claim 1, wherein the processor is configured to receive the adjacent vehicle information through the communication unit, generate the virtual lane information according to the adjacent vehicle information, and output the one or more virtual lanes based on the generated virtual lane information through the output unit.

11. The driver assistance apparatus according to claim 10, wherein the processor is configured to perform calibration to allow the one or more virtual lanes to match extension directions of one or more virtual lanes of other vehicles in front of the vehicle.

12. The driver assistance apparatus according to claim 11, further comprising a light module configured to irradiate one or more laser beams to a road surface around the vehicle to display the one or more virtual lanes, wherein the processor is configured to output, through the light module, the one or more virtual lanes matching the one or more virtual lanes irradiated by other vehicles in front of the vehicle.

13. The driver assistance apparatus according to claim 11, wherein the processor is configured to transmit the virtual lane information to the other vehicles adjacent to the left, right, and rear of the vehicle, through the communication unit.

14. The driver assistance apparatus according to claim 10, wherein the processor is configured to calculate a gap relative to the other vehicles driving on the left or right of the vehicle and generate the virtual lane information according to the gap.

15. The driver assistance apparatus according to claim 14, wherein the processor is configured to, based on the generated virtual lane information mismatching virtual lane information of the other vehicles driving on the left or right, perform calibration on the generated virtual lane information to overlap with the virtual lane information of the other vehicles driving on the left or right.

16. The driver assistance apparatus according to claim 1, wherein the driver assistance apparatus includes the camera that is configured to capture the one or more images around the vehicle, and
wherein the processor is configured to process the one or more images, detect one or more objects to serve as bases of virtual lane generation to generate the image information, and generate the virtual lane information according to the image information.

17. The driver assistance apparatus according to claim 16, further comprising a distance sensor configured to sense a distance between the vehicle and an object around the vehicle to acquire distance information, wherein the processor is configured to use the distance between the object and the vehicle to generate the virtual lane information.

18. The driver assistance apparatus according to claim 17, wherein the processor is configured to calculate an entire road width that allows driving according to the image information and the distance information, generate the virtual lane information according to the entire road width, and output the entire road width and the one or more virtual lanes based on the generated virtual lane information together through the output unit.

19. The driver assistance apparatus according to claim 18, wherein the processor is configured to detect a driving blocking object or a risky adjacent vehicle from the image information, and generate the virtual lane information to avoid the driving blocking object or the risky adjacent vehicle.

20. The driver assistance apparatus according to claim 16, wherein the processor is configured to detect a lane adjacent to the vehicle, detect a road direction through map information in the navigation information, and generate the virtual lane information to allow the detected lane to be extended along the road direction.

21. The driver assistance apparatus according to claim 8, wherein the output unit comprises a display unit that is a head up display, the head up display being configured to display on a windshield the one or more virtual lanes as an augmented reality image that corresponds to an external image reflected through the windshield, wherein the processor is configured to generate the corresponding virtual lane information based on image information before contamination of the windshield, and display the one or more virtual lanes as the augmented reality image.

22. The driver assistance apparatus according to claim 21, further comprising a distance sensor configured to sense a distance between the vehicle and an object around the vehicle to acquire distance information, wherein the processor is configured to acquire a distance to a front vehicle from the distance sensor, and display, through the display unit, a virtual image of the front vehicle according to the distance.

23. The driver assistance apparatus according to claim 21, wherein the processor is configured to detect a control signal for removing the contamination of the windshield and transmit the detected control signal to a control unit of the vehicle.

24. The driver assistance apparatus according to claim 21, wherein the processor is configured to allow the vehicle to perform self-driving until the contamination of the windshield is removed.

25. The driver assistance apparatus according to claim 16, wherein the processor is configured to receive the map information that includes a crossroad, detect a current traffic lane of the vehicle based on the image information, and generate the one or more virtual lanes that extends from the current traffic lane to another traffic lane that is connected to the crossroad and that corresponds to the current traffic lane.

26. The driver assistance apparatus according to claim 1, wherein the processor is configured to generate a destination route in the navigation information and virtual lanes according to a width of a vehicle based on detecting, from the image information or a current position of the vehicle obtained through the navigation information, that the vehicle is driving on an unpaved road.

27. A vehicle comprising:
one or more wheels;
a power source configured to drive the one or more wheels; and
a driver assistance apparatus comprising:
a processor configured to:
from a camera connected to the vehicle, image information that includes one or more images around the vehicle,
from a sensor unit connected to the vehicle, sensor information that includes at least one of a distance from the vehicle to an object outside of the vehicle or viability around the vehicle,
from a navigation device, navigation information that includes at least one of a destination, route information to the destination, or map information, or
from an adjacent vehicle, adjacent vehicle information that includes at least one of a position of the adjacent vehicle, a speed of the adjacent vehicle, a driving direction of the adjacent vehicle,
identify at least one lane based on at least one of the image information, the sensor information, the navigation information, or the adjacent vehicle information, and
based on at least one lane not being identified, generate virtual lane information that indicates a driving path of the vehicle;
an output unit configured to output one or more virtual lanes based on the generated virtual lane information, and
a communication unit configured to transmit the virtual lane information of the vehicle to other vehicles within a certain distance from the vehicle and to receive virtual lane information of the other vehicles from the other vehicles within the certain distance from the vehicle,
wherein the one or more virtual lanes include a first virtual lane indicating the driving path of the vehicle and a second virtual lane indicating a driving path of one of the other vehicles,
wherein the processor is further configured to cause the output unit to display the first virtual lane and the second virtual lane, and
wherein the processor is further configured to perform calibration to match the first virtual lane to the second virtual lane determined based on the received virtual lane information of the other vehicles.

* * * * *